United States Patent
Yu

(10) Patent No.: US 10,904,121 B2
(45) Date of Patent: Jan. 26, 2021

(54) DATA PACKET TRANSMISSION METHOD AND DEVICE

(71) Applicant: HUAWEI TECHNOLOGIES CO., LTD., Shenzhen (CN)

(72) Inventor: Jian Yu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/423,191

(22) Filed: May 28, 2019

(65) Prior Publication Data

US 2019/0280953 A1    Sep. 12, 2019

Related U.S. Application Data

(63) Continuation of application No. PCT/CN2017/108021, filed on Oct. 27, 2017.

(30) Foreign Application Priority Data

Nov. 29, 2016    (CN) .......................... 2016 1 1073991

(51) Int. Cl.
*H04L 12/26*        (2006.01)
*H04L 1/00*         (2006.01)
(Continued)

(52) U.S. Cl.
CPC ............ *H04L 43/0847* (2013.01); *H04L 1/00* (2013.01); *H04L 1/0007* (2013.01);
(Continued)

(58) Field of Classification Search
CPC ... H04L 1/0007; H04L 1/0041; H04L 1/0061; H04L 1/0079; H04L 1/0083; H04L 43/0847; H04L 69/22; H04W 28/06
See application file for complete search history.

(56) References Cited

U.S. PATENT DOCUMENTS

| 7,609,724 | B1 | 10/2009 | Frederiks et al. |
| 7,983,252 | B2 | 7/2011 | Frederiks et al. |

(Continued)

FOREIGN PATENT DOCUMENTS

| CN | 1706163 A | 12/2005 |
| CN | 102090001 A | 6/2011 |

(Continued)

OTHER PUBLICATIONS

IEEE Std 802.11™—2016, IEEE Standard for Information technology—Telecommunication and information exchange between systems Local and metropolitan area networks—Specific requirements, Part 11: Wireless LAN Medium Access Control (MAC) and Physical Layer (PHY) Specifics, total 3534 pages.

(Continued)

*Primary Examiner* — Gary Mui
(74) *Attorney, Agent, or Firm* — Kilpatrick Townsend & Stockton LLP

(57) ABSTRACT

This application discloses a data packet transmission method, a receiving device, and a sending device. The method includes: receiving, by a receiving device, a data packet, where the data packet includes at least one pair of a delimiter and an information element; the delimiter is used to separate two adjacent information elements; the delimiter includes a cyclic redundancy code field and an information element type field; in each pair of a delimiter and an information element, the information element type field is used to indicate a type of the information element; and one type of information element is uniquely corresponding to one information element length; and parsing, by the receiving device, the information element based on the cyclic redundancy code field and the information element type field.

19 Claims, 11 Drawing Sheets

(51) Int. Cl.
  *H04L 29/06* (2006.01)
  *H04W 28/06* (2009.01)
  *H04W 84/12* (2009.01)

(52) U.S. Cl.
  CPC ............ *H04L 1/0061* (2013.01); *H04L 69/22* (2013.01); *H04W 28/06* (2013.01); *H04W 84/12* (2013.01)

(56) References Cited

U.S. PATENT DOCUMENTS

| | | | |
|---|---|---|---|
| 2004/0076188 A1* | 4/2004 | Milbar | H04H 20/30 370/514 |
| 2010/0110898 A1* | 5/2010 | Effenberger | H04L 69/08 370/241.1 |
| 2015/0010019 A1* | 1/2015 | Bao | H04L 69/22 370/474 |
| 2015/0036673 A1 | 2/2015 | Asterjadhi et al. | |
| 2015/0063111 A1* | 3/2015 | Merlin | H04L 47/24 370/235 |
| 2016/0043946 A1 | 2/2016 | Merlin et al. | |
| 2016/0065466 A1 | 3/2016 | Abraham et al. | |
| 2016/0119451 A1* | 4/2016 | Stacey | H04W 28/06 370/392 |
| 2016/0134406 A1* | 5/2016 | Chu | H04L 5/0055 370/329 |
| 2017/0208065 A1* | 7/2017 | Yajima | H04L 63/1416 |
| 2019/0132107 A1* | 5/2019 | Ahn | H04W 28/065 |
| 2020/0045634 A1* | 2/2020 | Kneckt | H04L 12/1881 |
| 2020/0137612 A1* | 4/2020 | Li | H04W 52/0216 |

FOREIGN PATENT DOCUMENTS

| | | |
|---|---|---|
| CN | 102595494 A | 7/2012 |
| CN | 105432114 A | 3/2016 |
| CN | 106161410 A | 11/2016 |
| WO | 2013117029 A1 | 8/2013 |

OTHER PUBLICATIONS

IEEE P802.11n(TM)/D2.02 Draft Standard for Information Technology—Telecommunications and information exchange between systems—Local and metropolitan area networks—Specific requirements—Part 11 : Wireless LAN Medium Access Control (MAC) and Physical Layer (PHY) specifications: Amendment 4(#933):"", May 3, 2007, pp. 2,119-123, XP002664859

Robert Stacey (Intel): "A-MPDU delimiter changes; 11-10-1093-01-00ac-a-mpdu-delimiter-changes", IEEE802.11-10/1093r1, Sep. 12, 2010, pp. 1-16, XP017676191.

* cited by examiner

| End of frame | Reserved bit | MPDU length | Cyclic redundancy code | Delimiter signature |
|---|---|---|---|---|
| 1 | 1 | 14 | 8 | 8 |

Bits

DATA PACKET TRANSMISSION METHOD AND DEVICE

CROSS-REFERENCE TO RELATED APPLICATIONS

This application is a continuation of International Application No. PCT/CN2017/108021, filed on Oct. 27, 2017, which claims priority to Chinese Patent Application No. 201611073991.1, filed on Nov. 29, 2016. The disclosures of the aforementioned applications are incorporated herein by reference in their entireties.

TECHNICAL FIELD

This application relates to the communications field, and more specifically, to a data packet transmission method and a device.

BACKGROUND

In the communications field, an access point (Access Point, AP) and a station (Station, STA) exchange data, control information, and management information by using a Medium Access Control (Medium Access Control, MAC) protocol data unit (MAC Protocol Data Unit, MPDU).

In the 802.11ac standard, to improve efficiency of a MAC layer in a system, an aggregate Media Access Control protocol data unit (Aggregate MPDU, A-MPDU) is introduced. A plurality of MPDUs are combined and then sent by using one data packet, but not a plurality of data packets. The A-MPDU is carried in a data field of a physical layer protocol data unit (Physical Layer Protocol Data Unit, PPDU). The A-MPDU carries a plurality of A-MPDU subframes, each A-MPDU subframe includes an MPDU delimiter (delimiter), an MPDU, and a padding part, and the MPDU delimiter is used to separate a plurality of aggregate MPDUs.

A core concept of a new generation wake up radio (Wake up Radio) working group is that a receiving device (such as a STA) further includes a low-power-consumption wake up receiver (Wake up Receiver, WUR) in addition to an 802.11 main radio (802.11 main radio, MR) of a conventional 802.11 transceiver end. When the 802.11 main radio enters deep sleep, the low power-consumption WUR wakes up and starts to work. An AP sends a wake up packet (Wake Up Packet, WUP) to the WUR, the WUR wakes up the 802.11 main radio, and the AP communicates with the 802.11 main radio. In this way, energy of a device consumed during idle listening (idle listening) can be effectively reduced. Usually, a WUP is relatively short, and an information bit transmission time for the WUP is relatively long; therefore, information needs to be separated by using a delimiter. Because an MPDU delimiter is relatively long and requires a relatively large overhead, application of the MPDU delimiter to the WUP leads to low transmission efficiency.

In the Internet of Things, for example, in some low-speed scenarios and applications related to a sensor, a data packet rate is relatively low, and a relatively small volume of data is usually carried in a data field, that is, there are only several bytes to dozens of bytes. Therefore, use of an MPDU delimiter causes a relatively large overhead, and affects transmission efficiency.

SUMMARY

This application provides a data packet transmission method and a device, so as to reduce an overhead caused by a delimiter on the premise of implementing a function of the delimiter, reduce complexity of a receiving device, and improve transmission efficiency.

According to a first aspect, a data packet transmission method is provided, where the method includes: receiving, by a receiving device, a data packet, where the data packet includes at least one pair of a delimiter and an information element; the delimiter is used to separate two adjacent information elements; the delimiter includes a cyclic redundancy code field and an information element type field; in each pair of a delimiter and an information element, the information element type field is used to indicate a type of the information element; and one type of information element is uniquely corresponding to one information element length; and parsing, by the receiving device, the information element based on the cyclic redundancy code field and the information element type field.

According to the data packet transmission method provided in the first aspect, a simpler delimiter format is used, an overhead of the delimiter is reduced on the premise of implementing a function of the delimiter, an occupied resource is reduced, transmission efficiency is improved, and complexity of the receiving device is reduced.

In a possible implementation of the first aspect, the parsing, by the receiving device, the information element based on the cyclic redundancy code field and the information element type field includes: determining a first delimiter, in the data packet, that passes cyclic redundancy code field check; determining a length of a first information element based on a type of the first information element that is corresponding to an information element type field in the first delimiter; and parsing the first information element based on the type of the first information element and the length of the first information element.

In a possible implementation of the first aspect, the parsing, by the receiving unit, the information element based on the cyclic redundancy code field and the information element type field includes: determining a first delimiter, in the data packet, that does not pass cyclic redundancy code field check, where a length of the first delimiter is Z bits; sequentially extracting content whose length is Z bits in the data packet by using a sliding window, and determining a second delimiter, in the data packet, that is adjacent to the first delimiter and that passes the cyclic redundancy code field check; extracting a first information element between the first delimiter and the second delimiter; determining a type of the first information element based on a length of the first information element, or determining a type of the first information element based on a length of the first information element and a sub-type field, in the first information element, used to indicate the type of the first information element; and parsing the first information element based on the type of the first information element and the length of the first information element.

In another possible implementation of the first aspect, in the data packet received by the receiving device, the delimiter further includes a length field; in each pair of a delimiter and an information element, the length field is used to indicate a length of the information element; and the parsing, by the receiving device, the information element based on the cyclic redundancy code field and the information element type field includes: parsing, by the receiving device, the information element based on the cyclic redundancy code field and at least one of the information element type field and the length field. According to the data packet transmission method provided in this implementation, a simpler delimiter format is used, and the length field used to indicate the information element length is added to the delimiter. This can increase robustness of the delimiter, reduce complexity of the receiving device, improve recoverability of the delimiter, reduce an overhead of the delimiter, and improve transmission efficiency.

In a possible implementation of the first aspect, the parsing, by the receiving device, the information element based on the cyclic redundancy code field and at least one of the information element type field and the length field includes: determining a first delimiter, in the data packet, that passes cyclic redundancy code field check; extracting a first information element based on either of an information element length corresponding to an information element type field in the first delimiter and an information element length indicated by a length field in the first delimiter; and parsing the first information element based on a length of the first information element and a type that is of the first information element and is indicated by the information element type field in the first delimiter.

In a possible implementation of the first aspect, the parsing, by the receiving device, the information element based on the cyclic redundancy code field and at least one of the information element type field and the length field includes: determining a first delimiter, in the delimiter, that does not pass cyclic redundancy code field check, where a length of the first delimiter is R bits; when an information element length corresponding to an information element type field in the first delimiter is corresponding to an information element length indicated by a length field in the first delimiter, extracting the information element based on the information element length corresponding to the information element type field in the first delimiter or based on the information element length indicated by the length field in the first delimiter, and performing frame check sequence check on the extracted information element; or when an information element length corresponding to an information element type field in the first delimiter is not corresponding to an information element length indicated by a length field in the first delimiter, extracting the information elements separately based on the information element length corresponding to the information element type field in the first delimiter and based on the information element length indicated by the length field in the first delimiter, and separately performing frame check sequence check on the extracted information elements; and parsing the information element based on a frame check sequence check result.

In a possible implementation of the first aspect, the parsing, by the receiving device, the information element based on a frame check sequence check result includes: determining, a first information element, that passes the frame check sequence check; and determining a type of the first information element based on a length of the first information element, or determining a type of the first information element based on a length of the first information element and a sub-type field, in the first information element, used to indicate the type of the first information element; and parsing the first information element based on the type of the first information element and the length of the first information element.

In a possible implementation of the first aspect, the parsing, by the receiving device, the information element based on a frame check sequence check result includes: determining aan information elements that does not pass the frame check sequence check; sequentially extracting content whose length is R bits in the data packet by using a sliding window, and determining a second delimiter, in the data packet, that is adjacent to the first delimiter and that passes the cyclic redundancy code field check; extracting a first information element between the first delimiter and the second delimiter; determining a type of the first information element based on a length of the first information element, or determining a type of the first information element based on a length of the first information element and a sub-type field, in the first information element, used to indicate the type of the first information element; and parsing the first information element based on the type of the first information element and the length of the first information element.

According to a second aspect, a data packet transmission method is provided, where the method includes: generating, by a sending device, a data packet, where the data packet includes at least one pair of a delimiter and an information element; the delimiter is used to separate two adjacent information elements; the delimiter includes a cyclic redundancy code field and an information element type field; in each pair of a delimiter and an information element, the information element type field is used to indicate a type of the information element; and one type of information element is uniquely corresponding to one information element length; and sending, by the sending device, the data packet.

According to the data packet transmission method provided in the second aspect, a simpler delimiter format is used, an overhead of the delimiter is reduced on the premise of implementing a function of the delimiter, an occupied resource is reduced, transmission efficiency is improved, and complexity of a receiving device is reduced.

In a possible implementation of the second aspect, in the data packet generated by the sending device, the delimiter further includes a length field; and in each pair of a delimiter and an information element, the length field is used to indicate a length of the information element.

In another possible implementation of the second aspect, in the data packet generated by the sending device, when one information element length is corresponding to at least two types of information elements, the information element further includes a sub-type field used to indicate the type of the information element.

According to a third aspect, a data packet transmission method is provided, where the method includes: receiving, by a receiving device, a data packet, where the data packet includes at least one pair of a delimiter and an information element, the delimiter is used to separate two adjacent information elements, and the delimiter includes only a cyclic redundancy code field; and parsing, by the receiving device, the information element based on the cyclic redundancy code field.

In a possible implementation of the third aspect, the parsing, by the receiving device, the information element based on the cyclic redundancy code field includes: determining two consecutive delimiters, in the delimiter, that pass cyclic redundancy code field check; and parsing content of an information element between the two consecutive delimiters.

In a possible implementation of the third aspect, the determining two consecutive delimiters, in the delimiter, that pass cyclic redundancy code field check includes: determining a first delimiter, in the delimiter, that passes the cyclic redundancy code field check; sequentially extracting fixed-length content in the data packet by using a sliding window; and determining a second delimiter, in the data packet, that is adjacent to the first delimiter and that passes the cyclic redundancy code field check.

According to a fourth aspect, a data packet transmission method is provided, where the method includes: generating, by a sending device, a data packet, where the data packet includes at least one pair of a delimiter and an information element, the delimiter is used to separate two adjacent information elements, and the delimiter includes only a cyclic redundancy code field; and sending, by the sending device, the data packet.

According to a fifth aspect, a receiving device is provided, where the receiving device includes a transceiver and a processor, which are configured to implement functions that are performed by the receiving device in the foregoing aspects. The functions may be implemented by using hardware, or may be implemented by hardware by executing corresponding software. The hardware or the software includes one or more modules corresponding to the foregoing functions. The receiving device may further include a memory.

According to a sixth aspect, a receiving device is provided, including a transceiver module and a processing module, which are configured to support the receiving device in performing corresponding functions in the foregoing methods. The receiving device may further include a storage module.

According to a sixth aspect, a sending device is provided, including a processor and a transceiver, which are configured to implement functions that are performed by the sending device in the foregoing aspects. The functions may be implemented by using hardware, or may be implemented by hardware by executing corresponding software. The hardware or the software includes one or more modules corresponding to the foregoing functions. The sending device may further include a memory.

According to an eighth aspect, a sending device is provided, including a processing module and a transceiver module, which are configured to support the sending device in performing corresponding functions in the foregoing methods. The sending device may further include a storage module.

According to a ninth aspect, a communications system is provided, where the communications system includes the receiving device provided in the fifth aspect or the sixth aspect and the sending device provided in the seventh aspect or the eighth aspect. The communications system is capable of implementing the data packet transmission methods provided in the first aspect and the second aspect.

According to a tenth aspect, a computer-readable medium is provided, and is configured to store a computer program. The computer program includes instructions used to perform the methods in the first aspect or any possible implementation of the first aspect, and in the third aspect or any possible implementation of the third aspect.

According to an eleventh aspect, a computer-readable medium is provided, and is configured to store a computer program. The computer program includes instructions used to perform the methods in the second aspect or any possible implementation of the second aspect, and in the fourth aspect or any possible implementation of the fourth aspect.

DESCRIPTION OF EMBODIMENTS

Figure 1:
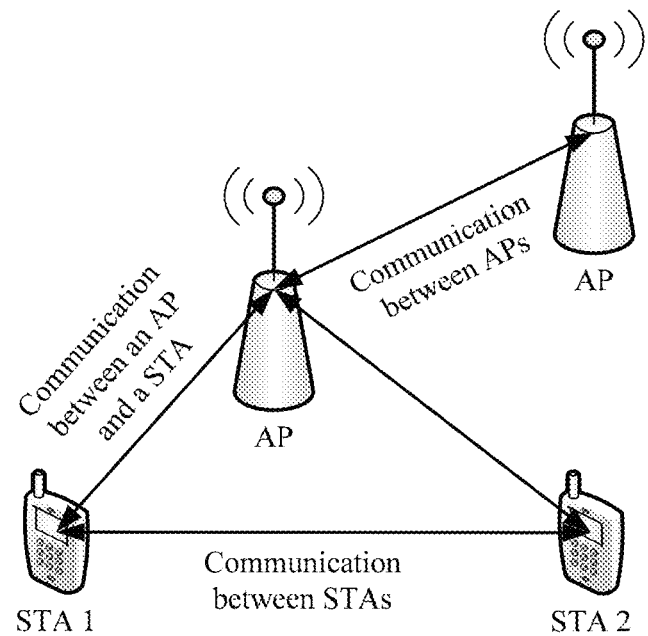
FIG. 1 is a schematic diagram of a typical WLAN application scenario.

The following describes the technical solutions in this application with reference to the accompanying drawings.

The technical solutions in the embodiments of this application may be applied to various communications systems, such as: a Global System for Mobile Communications (Global System for Mobile communication, GSM), a Code Division Multiple Access (Code Division Multiple Access, CDMA) system, a Wideband Code Division Multiple Access (Wideband Code Division Multiple Access, WCDMA) system, a General Packet Radio Service (General Packet Radio Service, GPRS), a Long Term Evolution (Long Term Evolution, LTE) system, an LTE frequency division duplex (Frequency Division Duplex, FDD) system, an LTE time division duplex (Time Division Duplex, TDD) system, a Universal Mobile Telecommunications System (Universal Mobile Telecommunications System, UMTS), a wireless local area network (Wireless Local Area Network, WLAN) system, a Worldwide Interoperability for Microwave Access (Worldwide Interoperability for Microwave Access, WiMAX) communications system, a future 5th Generation (5th Generation, 5G) system, or a new radio (New Radio, NR) system.

The WLAN system is merely used as an example for description in the embodiments of this application, and the embodiments of this application are not limited thereto. A method and a device according to the embodiments of this application may also be applied to another communications system. Similarly, an AP and a STA in the WLAN system are merely used as an example for description in the embodiments of this application, and this application is not limited thereto. The method and the device according to the embodiments of this application may also be applied to a base station and user equipment in another communications system.

A station in the embodiments of this application may be a terminal device, user equipment, an access terminal, a subscriber unit, a subscriber station, a mobile station, a mobile console, a remote station, a remote terminal, a mobile device, a user terminal, a terminal, a wireless communications device, a user agent, or a user apparatus. The terminal device may be a cellular phone, a cordless telephone set, a Session Initiation Protocol (Session Initiation Protocol, SIP) phone, a wireless local loop (Wireless Local Loop, WLL) station, a personal digital assistant (Personal Digital Assistant, PDA), a handheld device or a computing device having a wireless communication function, another processing device, an in-vehicle device, or a wearable device connected to a wireless modem, a terminal device in a future 5G network, a terminal device in a future evolved public land mobile network (Public Land Mobile Network, PLMN), or the like. This is not limited in the embodiments of this application.

An access point in the embodiments of this application may be a network device of a device configured to communicate with a terminal device. The network device may be a base transceiver station (Base Transceiver Station, BTS) in a Global System for Mobile Communication (Global System for Mobile communication, GSM) or a Code Division Multiple Access (Code Division Multiple Access, CDMA) system, a NodeB (NodeB, NB) in a Wideband Code Division Multiple Access (Wideband Code Division Multiple Access, WCDMA) system, an evolved NodeB (Evolved NodeB, eNB or eNodeB) in an LTE system, or a radio controller in a cloud radio access network (Cloud Radio Access Network, CRAN) scenario. Alternatively, the network device may be a relay node, an in-vehicle device, a wearable device, a network device in a future 5G network, a network device in a future evolved PLMN network, or the like. This is not limited in the embodiments of this application.

FIG. 1 is a schematic diagram of an application scenario according to an embodiment of this application. As shown in FIG. 1, a transmit end and a receive end are not limited in the embodiments of this application, and point-to-point communication may be performed, or point-to-multipoint or multipoint-to-point communication may be performed. A data packet transmission method in the embodiments of this application may be applied between APs, between STAs, or between an AP and a STA. In other words, an AP may be a receiving device or a sending device. Likewise, a STA may be a receiving device or a sending device. For example, the data packet transmission method in the embodiments of this application may be applied to communication between an AP 1 and a STA 1, between the AP 1 and a STA 2, between the STA 1 and the STA 2, and between the AP 1 and an AP 2.

It should be understood that the application scenario shown in FIG. 1 is merely used as an example for description in the embodiments of this application, and this application is not limited thereto. For example, the system may include more APs and STAs.

Figure 2:
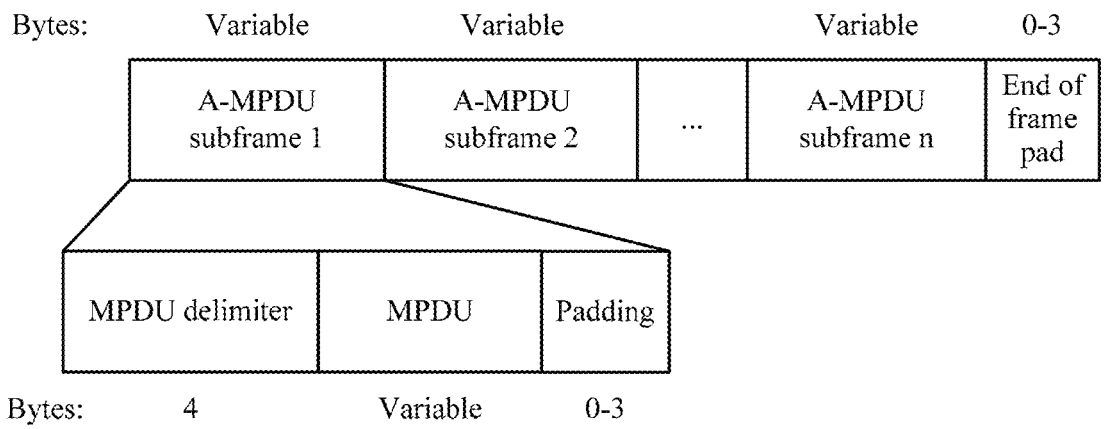
FIG. 2 is a schematic diagram of a prior-art data packet format.
Figures 3, 4:
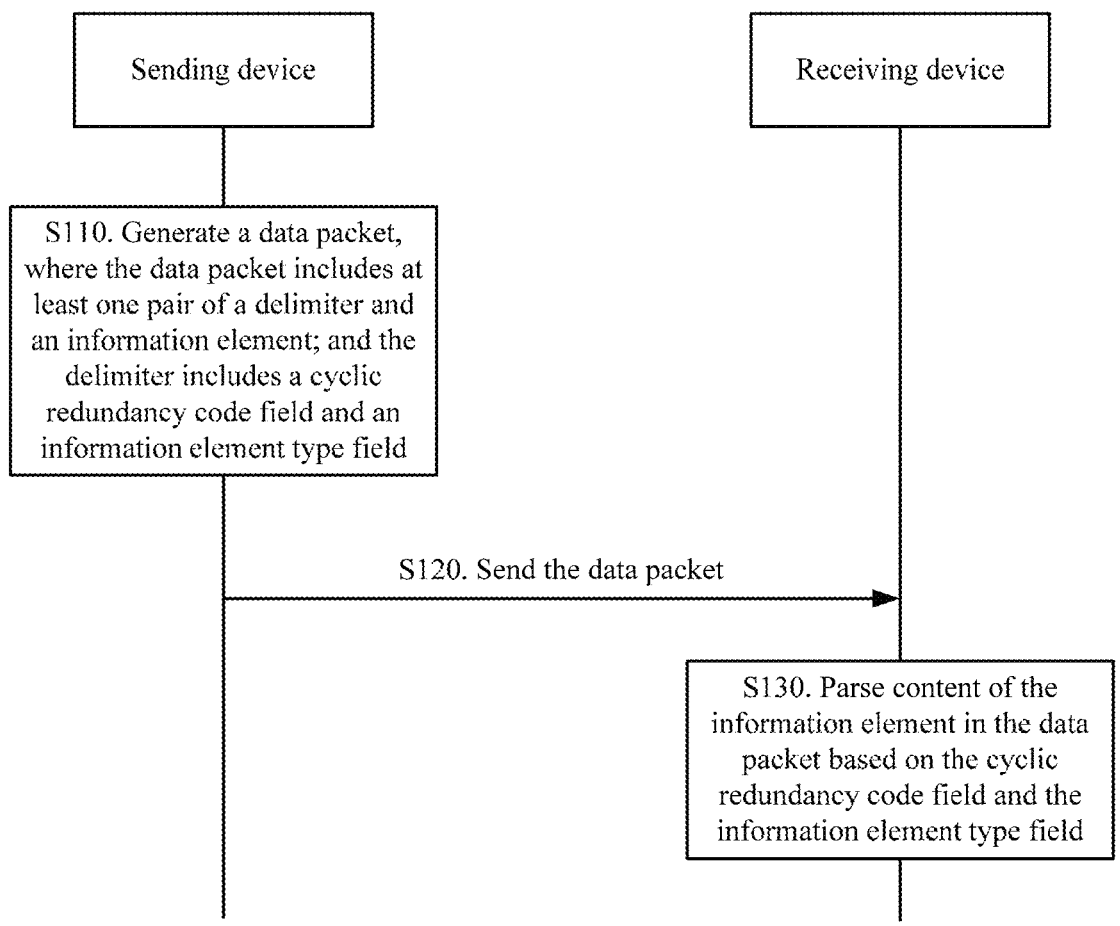
FIG. 3 is a schematic diagram of a prior-art MPDU delimiter format.
FIG. 4 is a schematic flowchart of a data packet transmission method according to an embodiment of this application.

FIG. 2 is a schematic diagram of a data packet format in the 802.11ac standard, and FIG. 3 is a schematic diagram of an MPDU delimiter format in an 802.11ac system. As shown in FIG. 2, in the 802.11ac standard, an A-MPDU carries a plurality of A-MPDU subframes and an end of frame pad (end of frame pad, EOF pad), for example, an A-MPDU subframe 1, an A-MPDU subframe 2, . . . , and an A-MPDU subframe n. A length of an A-MPDU subframe is usually variable, and a length of an end of frame pad is usually 0 to 3 bytes. Each A-MPDU subframe includes an MPDU delimiter (delimiter), an MPDU, and a padding part. The MPDU delimiter is used to separate a plurality of aggregate MPDUs. Usually, a length of the MPDU delimiter is 4 bytes, a length of the MPDU is variable, and a length of the padding part is 0 to 3 bytes.

As shown in FIG. 3, an MPDU delimiter in the 802.11ac system has 4 bytes in total, and the MPDU delimiter includes an end of frame (End of frame, EOF) field, an MPDU length field, a delimiter signature (Delimiter Signature) field, a cyclic redundancy code (Cyclic Redundancy Code, CRC) field, and a reserved bit (Reserved) field. The end of frame field is used to indicate whether an MPDU is a last MPDU, and is usually 1 bit in length. The MPDU length field is used to indicate a quantity of bytes of an MPDU following closely behind, and is usually 14 bits in length. The delimiter signature field is a sequence having a particular characteristic, is usually 8 bits in length, and is used to help a receive end search for a delimiter. Even if the receive end incorrectly demodulates a delimiter, the receive end can still search a next delimiter signature for a next MPDU, so as to prevent error extension. The cyclic redundancy code field is to protect first 16 bits of an entire delimiter, is usually 8 bits in length, and is used to help the receive end check whether an error occurs in a delimiter. The reserved bit field is usually 1 bit in length. In addition, based on a 4-byte sliding window, every 4 bytes are used to check whether a CRC is passed or may be used to search for a next delimiter. Even if an error occurs in a delimiter, the receiving device can still search for a next delimiter, and determine data between a current incorrect delimiter and the next delimiter as an MPDU, to read the MPDU.

At present, there are still delimiters in other formats. For example, a delimiter includes an MPDU length and a CRC, or a combination of an MPDU length and a CRC, and the like. However, in the Internet of Things, for example, in some low-speed application scenarios and applications and in a wake up radio working group, a prior-art delimiter is still used to separate information. This causes a relatively large overhead of the delimiter, occupies a lot of resources, and makes the receiving device more complex.

To resolve the foregoing problem, an embodiment of this application provides a data packet transmission method. FIG. 4 is a schematic flowchart of a data packet transmission method 100 according to an embodiment of this application. The method 100 may be applied to the scenario in FIG. 1, and certainly, may be alternatively applied to another communication scenario. For example, structures of some signaling fields include a delimiter and an information element. This is not limited in this embodiment of this application. The method 100 includes the following steps.

S110. A sending device generates a data packet, where the data packet includes at least one pair of a delimiter and an information element; the delimiter is used to separate two adjacent information elements; the delimiter includes a cyclic redundancy code field and an information element type field; in each pair of a delimiter and an information element, the information element type field is used to indicate a type of the information element; and one type of information element is uniquely corresponding to one information element length.

S120. The sending device sends the data packet. Correspondingly, a receiving device receives the data packet. Specifically, the sending device sends the data packet to the receiving device, and the receiving device receives the data packet sent by the sending device.

S130. The receiving device parses content of the information element in the data packet based on the cyclic redundancy code field and the information element type field.

Therefore, according to the data packet transmission method in this embodiment of this application, a simpler delimiter format is used, an overhead of the delimiter is reduced on the premise of implementing a function of the delimiter, an occupied resource is reduced, transmission efficiency is improved, and complexity of the receiving device is reduced.

It should be understood that in this embodiment of this application, a frame check sequence (Frame Check Sequence, FCS) is also a CRC. Because the CRC is used to detect a MAC frame, the CRC is also referred to as an FCS. Generally, an FCS is used to check an entire MAC frame, and a CRC is used to check a field such as a signaling field or a delimiter. Therefore, in this embodiment of this application, the frame check sequence and the cyclic redundancy code are interchangeable, that is, the delimiter may also include a cyclic frame check sequence field and the information element type field. This is not limited in this embodiment of this application.

It should also be understood that in this embodiment of this application, in addition to the cyclic redundancy code field and the information element type field, the delimiter may include any one or more of an end of frame, a reserved bit, identification information of a station or an access point, and the like. This is not limited in this embodiment of this application.

Figure 5:
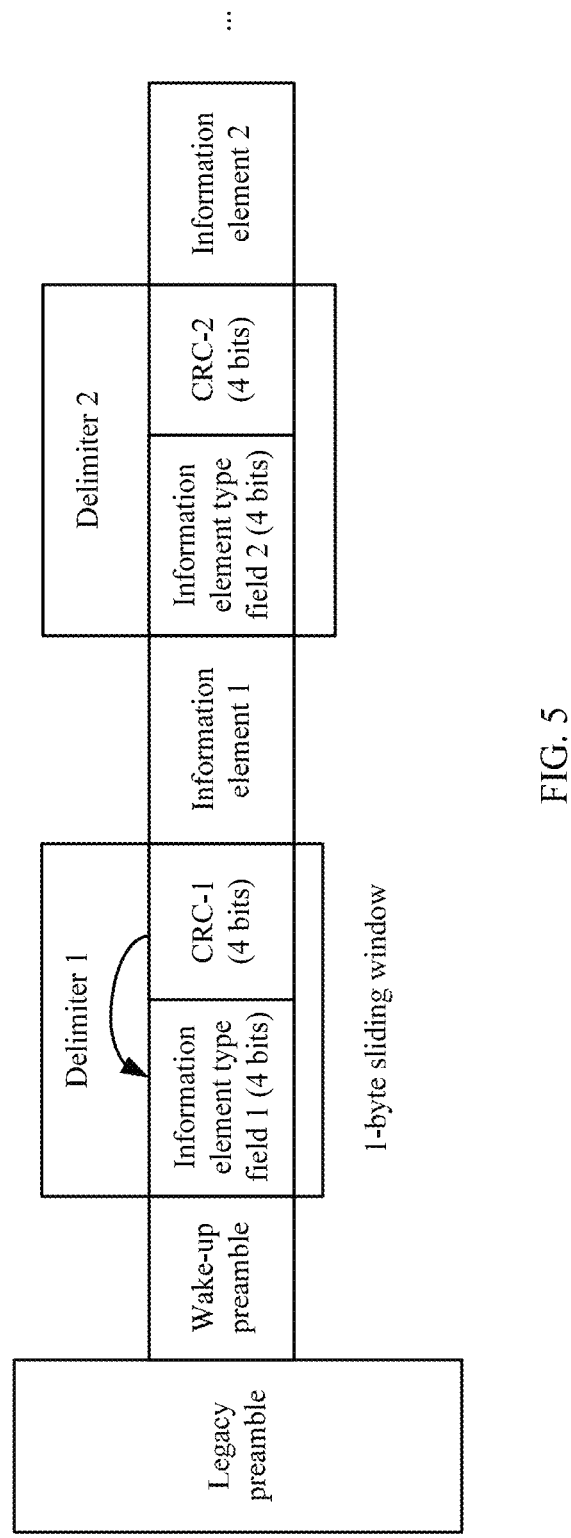
FIG. 5 is a schematic diagram of a data packet format and a delimiter format according to an embodiment of this application.

Optionally, FIG. 5 is a schematic diagram of a data packet format and a delimiter format according to an embodiment of this application. A data packet includes a legacy preamble (Legacy Preamble, L-Preamble), a wake-up preamble (Wake-up Preamble, W-Preamble), and a plurality of pairs of delimiters and information elements. It should be understood that FIG. 5 merely shows that the data packet includes two pairs of delimiters and information elements. However, a quantity of pairs of delimiters and information elements is not limited. The data packet may further include more pairs of delimiters and information elements. The L-Preamble is used to ensure coexistence (Coexistence) of data transmitted by using a common main link. The W-Preamble is usually used by the receiving device to perform wake up packet detection, signaling information reading, and the like. The delimiter in the data packet includes a cyclic redundancy code field and an information element type field. For one pair of a delimiter and an information element, whether the delimiter is correct is determined by checking the cyclic redundancy code field. The cyclic redundancy code field is to protect the information element type field, and a cyclic redundancy code is obtained through computation based on information in the information element type field. A receiving device may determine, by using the cyclic redundancy code field, whether the information element type field is correctly received. The information element may be a MAC frame such as a data frame, a beacon frame, or an acknowledgment frame, or may be a field at a physical layer. This is not limited in this embodiment of this application. A function of the delimiter is to separate a plurality of information elements. In each pair of a delimiter and an information element, the information element type field is used to indicate a type of a subsequent information element. In addition, one type of information element is uniquely corresponding to one information element length. In other words, a particular information element type field may indicate a particular type of information element, and for a type of information element, a unique information element length corresponding to the type of information element may be determined. Therefore, the information element type field does not need to indicate a length of a subsequent information element. This can significantly reduce an overhead of the delimiter.

It should be understood that in the data packet format and the delimiter format shown in FIG. 5, the preamble in the data packet may alternatively be another preamble, or there may be a plurality of preambles. For example, the preamble may be an Internet of Things preamble used for transmission of an Internet of Things station. This is not limited in this embodiment of this application.

Optionally, in an embodiment, if there is no field indicating the information element type in the information element, or when an information element with a specific length is corresponding to at least two types of information elements, in S110, a sub-type field used to indicate the information element type further exists at a fixed location (for example, a first bit to a third bit of the information element) of the information element in the data packet generated by the sending device, where the sub-type field is used to determine the type of the information element. Correspondingly, the receiving device receives the information element including the sub-type field.

Optionally, in an embodiment, in the data packet format and the delimiter format shown in FIG. 5, a mapping relationship between an information element type field, an information element type that belongs to a same pair as the information element type field, and an information element length may be listed in Table 1. For example, when the information element type field is 0000, according to the mapping relationship, the information element type may be determined to be a wake up frame, and a length of the wake up frame may be determined to be 20 bytes. In Table 1, 4-bit information element type fields may be used to represent 16 different information element types and 16 different information element lengths.

TABLE 1

Mapping table

| 4-bit information element type field | Information element type | Information element length (byte) |
|---|---|---|
| 0000 | Wake up frame | 20 |
| 0001 | Acknowledgment frame | 30 |
| . . . | . . . | |
| 1101 | Beacon frame | 40 |
| 1111 | Data frame | 50 |

It should be understood that the data packet format and the delimiter format shown in FIG. 5 are merely used as an example for description in this embodiment of this application, and this embodiment of this application is not limited thereto.

It should also be understood that in this embodiment of this application, Table 1 is merely used to represent a mapping relationship between the information element type field, the information element type, and the information element length. Another mapping relationship may alternatively exist therebetween. This is not limited in this embodiment of this application.

It should also be understood that in the data packet format and the delimiter format shown in FIG. 5, a length of the information element type field and a length of the cyclic redundancy code field each may alternatively be another quantity of bits, the information element type may alternatively be another type, and the information element length may alternatively be another length. For example, when there are a large quantity of information element types included in the data packet, an information element type field of 8 or more bits may be used for mapping of the information element type. This is not limited in this embodiment of this application.

Optionally, in an embodiment, in S130, the parsing, by the receiving device, content of the information element in the data packet based on the cyclic redundancy code field and the information element type field may include the following steps.

Step 1: Determine a first delimiter, in the data packet, that passes cyclic redundancy code field check.

Step 2: Determine a length of a first information element based on a type of the first information element that is corresponding to an information element type field in the first delimiter.

Step 3: Parse the first information element based on the type of the first information element and the length of the first information element.

Specifically, after receiving the data packet sent by the sending device, the receiving device starts to parse the content of the information element in the data packet. A type and a length of an information element need to be known for parsing content of this information element. Therefore, after receiving a correct delimiter, the receiving device may determine the information element type based on the information element type field in the delimiter, and determine the information element length based on an information element length corresponding to the information element type. In this way, content of the information element can be parsed.

It should be understood that the first delimiter and the first information element represent one type of delimiter and information element, that is, a delimiter and an information element that belong to a same pair in the data packet. In addition, if the cyclic redundancy code field of the delimiter passes check, such a delimiter is referred to as the first delimiter and such an information element is referred to as the first information element. Quantities of delimiters and information elements should not be limited.

The following uses the data packet format and the delimiter format shown in FIG. 5 as an example to describe in detail the steps of S130 of the method in an embodiment of this application.

As shown in FIG. 5, when the receiving device receives the data packet, the receiving device first determines whether a CRC-1 in a delimiter 1 passes a check. When the CRC-1 in the delimiter 1 passes the check, it indicates that the delimiter 1 is a correct delimiter; a type of an information element 1 may be determined as an acknowledgment frame based on an information element type field 1 in the delimiter 1, for example, as listed in Table 1, the information element type field 1 being 0001; and a length of the information element 1 may be determined based on the type of the information element 1. In this way, after learning the length and the type of the information element 1, the receiving device can correctly parse content of the information element 1. Then, the receiving device continues to parse content of an information element 2 based on an information element type field 2 and a CRC-2 in a delimiter 2 by using the same method.

It should be understood that the delimiter 1, the information element type field 1, and the information element 1 merely represent a delimiter and an information element that belong to a same pair. This should not impose any limitation on this embodiment of this application.

Optionally, in another embodiment, in S130, the parsing, by the receiving device, content of the information element in the data packet based on the cyclic redundancy code field and the information element type field may include the following steps.

Step 1: Determine a first delimiter, in the data packet, that does not pass cyclic redundancy code field check, where a length of the first delimiter is Z bits.

Step 2: Sequentially extract content whose length is Z bits in the data packet by using a sliding window, and determine a second delimiter, in the data packet, that is adjacent to the first delimiter and that passes the cyclic redundancy code field check.

Step 3: Extract a first information element between the first delimiter and the second delimiter.

Step 4: Determine a type of the first information element based on a length of the first information element, or determine a type of the first information element based on a length of the first information element and a sub-type field, in the first information element, used to indicate the type of the first information element.

Step 5: Parse the first information element based on the type of the first information element and the length of the first information element.

Specifically, after the receiving device receives the data packet sent by the sending device, when the first delimiter in the data packet does not pass the cyclic redundancy code check, whether the first delimiter is a correct delimiter cannot be determined. Therefore, content of the first information element that belongs to a same pair as the first delimiter still cannot be parsed based on the cyclic redundancy code field and the information element type field in the first delimiter. In this case, a next delimiter, namely, the second delimiter that is adjacent to the first delimiter and that passes the cyclic redundancy code check, needs to be searched for. In this embodiment of this application, optionally, content whose data packet length is equal to the length of the first delimiter and that is after the first information element is sequentially extracted by using the sliding window, until the second delimiter that is adjacent to the first delimiter and that passes the cyclic redundancy code check is found in the data packet. An information element between the first delimiter and the second delimiter is extracted and considered as the first information element. Because one type of information element is uniquely corresponding to one information element length, when an information element with a specific length can be used to uniquely determine one type of information element, that is, the information element type is in a one-to-one correspondence with the information element length, the type of the first information element can be reversely deduced based on the length of the first information element, so that the first information element can be parsed.

However, if an information element does not have a field indicating a type of the information element, or when an information element with a specific length is corresponding to at least two types of information elements, in this case, the type of the information element needs to be determined based on a length of the information element and a sub-type field that is at a fixed location in the information element and that is used to indicate the type of the information element. To be specific, the type of the first information element is determined based on the length of the first information element and a sub-type field that is at a fixed location in the first information element and that is used to indicate the type of the first information element. By using such a method, the type of the first information element is determined, and the content of the first information element is parsed based on the type of the first information element and the length of the first information element. If the next delimiter neither passes the cyclic redundancy code check, content of a next information element is parsed by using the same method.

It should be understood that the first delimiter and the second delimiter represent two types of delimiters. A quantity of delimiters should not be limited.

It should also be understood that a length of content extracted from the data packet by using the sliding window may alternatively be another length. This is not limited in this embodiment of this application.

The following uses the data packet format and the delimiter format shown in FIG. 5 as an example to describe in detail the steps of S130 of the method in another embodiment of this application.

As shown in FIG. 5, when the receiving device receives the data packet sent by the sending device, the receiving device first determines whether a CRC-1 in a delimiter 1 passes a check, where a length of the delimiter 1 is Z bits. When the CRC-1 in the delimiter 1 does not pass the check, whether the delimiter 1 is a correct delimiter cannot be determined. Consequently, content of an information element 1 cannot be parsed based on an information element type field 1 and the CRC-1 in the delimiter 1. In this case, the receiving device may sequentially extract content whose length is Z bits in the data packet and that is after the information element 1 by using the sliding window, until a second delimiter that is adjacent to the delimiter 1 and that passes the cyclic redundancy code check is found in the data packet. For example, the second delimiter herein may be a delimiter 2 or another delimiter. Then, an information element between the delimiter 1 and the second delimiter is extracted and considered as the information element 1. When the information element type is in a one-to-one correspondence with the information element length, a type of the information element 1 can be reversely deduced based on a length of the information element 1, and the content of the first information element can be parsed.

However, if an information element does not have a field indicating a type of the information element, or when an information element with a specific length is corresponding to at least two types of information elements, for example, when the acknowledgment frame in Table 1 is 20 bytes, a type of the information element 1 cannot be reversely deduced uniquely based on the information element 1 whose length is also 20 bytes. In this case, the type of the information element 1 needs to be determined based on the length of the information element 1 and a sub-type field, in the information element 1, used to indicate the type of the information element. For example, a first bit and a third bit in the information element 1 further indicate that the information element is a control frame. In this case, the type of the information element 1 can be determined, and content of the information element 1 can be parsed based on the type of the information element 1 and the length of the information element 1. If a next delimiter neither passes the cyclic redundancy code check, content of a next information element is parsed by using the same method.

According to the data packet transmission method in this embodiment of this application, because the delimiter includes the cyclic redundancy code field and the information element type field, a delimiter format is simpler, so that an overhead of the delimiter can be effectively reduced, an occupied resource is reduced, and system efficiency are improved.

Optionally, in an embodiment, on a basis of the delimiter format shown in FIG. 5, the delimiter may further include a length field; and in each pair of a delimiter and an information element, the length field is used to indicate a length of the information element. Correspondingly, S130 that the receiving device parses the content of the information element in the data packet based on the cyclic redundancy code field and the information element type field may include: parsing, by the receiving device, the information element based on the cyclic redundancy code field and at least one of the information element type field and the length field.

Figure 6:
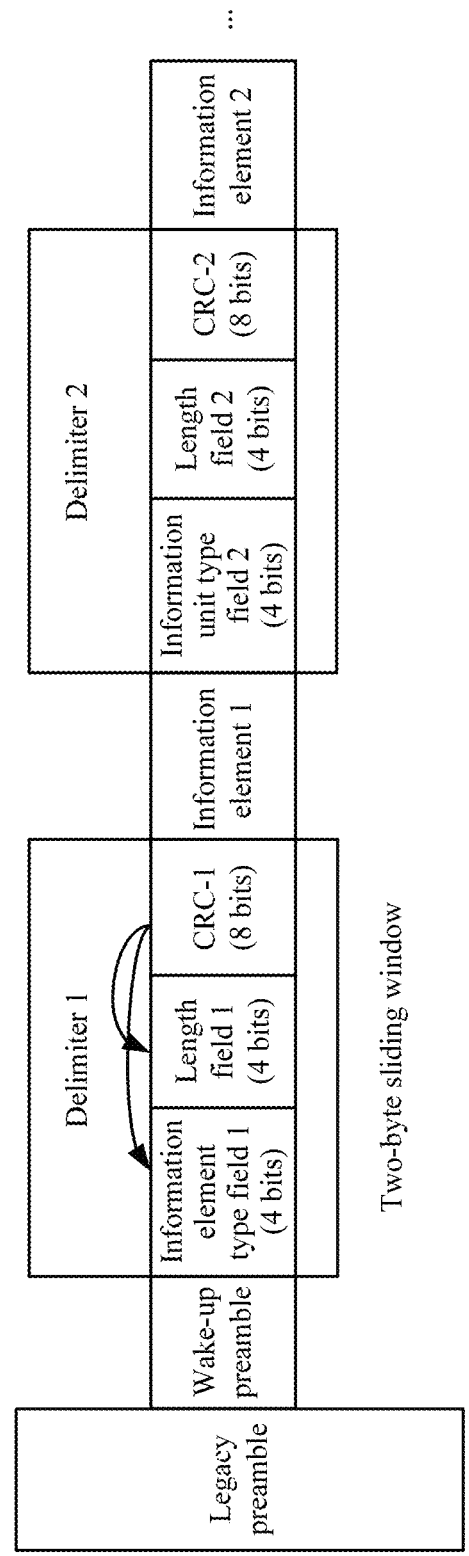
FIG. 6 is a schematic diagram of a data packet format and a delimiter format according to another embodiment of this application.

Specifically, in an embodiment, FIG. 6 is a schematic diagram of a data packet format and a delimiter format according to another embodiment of this application. The receiving device receives the data packet sent by the sending device, where a delimiter in the data packet includes an information element type field, a length field, and a cyclic redundancy code field. For one pair of a delimiter and a cyclic redundancy code, whether the delimiter is correct is determined by checking the cyclic redundancy code. The cyclic redundancy code field is to protect an information element type field and a length field. In each pair of a delimiter and an information element, the information element type field is used to indicate a type of a subsequent information element; and one type of information element is uniquely corresponding to one information element length. The length field is used to indicate a length of a subsequent information element.

According to the data packet transmission method in this embodiment of this application, a simpler delimiter format is used, and the length field used to indicate the information element length is added to the delimiter. This can increase robustness of the delimiter, reduce complexity of the receiving device, improve recoverability of the delimiter, and reduce an overhead of the delimiter.

Optionally, in an embodiment, in the data packet format and the delimiter shown in FIG. 6, a length of the information element type field is 4 bits, and a length of the length field is also 4 bits. Because the cyclic redundancy code field is to protect the information element type field and the length field, a length of the cyclic redundancy code field is 8 bits.

It should be understood that for the data packet format and the delimiter format shown in FIG. 6, that the length of the information element type field is 4 bits and the length of the length field is 4 bits is merely used as an example for description in this embodiment of this application, and this embodiment of this application is not limited thereto. For example, when there are many types of information elements included in the data packet, the length of the information element type field and the length of the length field each may be another quantity of bits. For example, the length of the information element type field and the length of the length field each may alternatively be 5 bits or 6 bits. This is not limited in this embodiment of this application.

It should also be understood that in this embodiment of this application, the length of the information element type field may be different from the length of the length field. For example, the length of the information element type field may be 5 bits, and the length of the length field may be 6 bits. The length of the cyclic redundancy code field may alternatively not be a sum of the length of the length field and the length of the information element type field. This is not limited in this embodiment of this application.

It should also be understood that in this embodiment of this application, similar to the mapping relationship between the information element type field and the information element length in Table 1, a relationship between the length field and the information element length may be another correspondence, provided that the length field may indicate a length of an information element that belongs to a same pair as the length field. This is not limited in this embodiment of this application.

Optionally, in an embodiment, in S130, the parsing, by the receiving device, the information element based on the cyclic redundancy code field and at least one of the information element type field and the length field includes the following steps.

Step 1: Determine a first delimiter, in the data packet, that passes cyclic redundancy code field check.

Step 2: Extract a first information element based on either of an information element length corresponding to an information element type field in the first delimiter and an information element length indicated by the length field in the first delimiter.

Step 3: Parse content of the first information element based on a length of the first information element and a type that is of the first information element and is indicated by the information element type field in the first delimiter.

Specifically, after receiving the data packet sent by the sending device, the receiving device starts to detect a correct delimiter in the data packet. When the delimiter in the data packet passes the cyclic redundancy code field check, the receiving device determines that the correct delimiter is received, may determine the information element type based on the information element type field in the delimiter, and determine the information element length based on a length corresponding to the information element type or based on an information element length corresponding to the length field. After the information element length and the information element type are known, content of the information element can be parsed.

The following uses the data packet format and the delimiter format shown in FIG. 6 as an example to describe in detail the steps of S130 of the method in an embodiment of this application.

When the receiving device receives the data packet sent by the sending device, where the data packet format is shown in FIG. 6, the receiving device first determines whether a CRC-1 in a delimiter 1 passes a check. When the CRC-1 in the delimiter 1 passes the check, it indicates that the delimiter 1 is a correct delimiter; a type of an information element 1 may be determined as an acknowledgment frame based on an information element type field 1 in the delimiter 1, for example, as listed in Table 1, the information element type field 1 being 0001; and a length of the information element 1 is determined based on the type of the information element 1 or based on an information element length indicated by a length field 1 in the delimiter. In this way, after learning the length and the type of the information element 1, the receiving device can correctly parse content of the information element 1. Then, the receiving device continues to parse content of an information element 2 based on a delimiter 2 and a CRC-2 by using the same method.

It should be understood that the delimiter 1, the information element type field 1, and the information element 1 merely represent a delimiter and an information element that belong to a same pair. This should not impose any limitation on this embodiment of this application.

Optionally, in another embodiment, in S130, the parsing, by the receiving device, the information element based on the cyclic redundancy code field and at least one of the information element type field and the length field includes the following steps.

Step 1: Determine a first delimiter, in the delimiter, that does not pass cyclic redundancy code field check.

Step 2: When an information element length corresponding to an information element type field in the first delimiter is corresponding to an information element length indicated by the length field in the first delimiter, extract the information element based on the information element length corresponding to the information element type field in the first delimiter or based on the information element length indicated by the length field in the first delimiter, and perform frame check sequence check on the extracted information element; or when an information element length corresponding to the information element type field in the first delimiter is not corresponding to an information element length indicated by the length field in the first delimiter, extract the information elements separately based on the information element length corresponding to the information element type field in the first delimiter and based on the information element length indicated by the length field in the first delimiter, and separately perform frame check sequence check on the extracted information elements.

Step 3: Parse the information element based on a frame check sequence check result.

Specifically, after the receiving device receives the data packet sent by the sending device, when the first delimiter in the data packet does not pass the cyclic redundancy code check, whether the first delimiter is a correct delimiter cannot be determined. Therefore, content of the first information element that belongs to a same pair as the first delimiter still cannot be parsed based on the cyclic redundancy code field, the information element type field, and the length field in the first delimiter. In this case, whether the information element length corresponding to the information element type field in the first delimiter is corresponding to the information element length indicated by the length field in the first delimiter is determined, with no need to start a sliding window immediately to search for a next delimiter. For example, whether the information element length corresponding to the information element type field in the first delimiter is corresponding to the information element length indicated by the length field in the first delimiter may be determined through detection.

When the information element length corresponding to the information element type field in the first delimiter is corresponding to the information element length indicated by the length field in the first delimiter, it indicates that the information element length corresponding to the information element type field in the first delimiter is equal to the information element length indicated by the length field in the first delimiter. In this case, whether the information element is a correct information element still cannot be determined, and therefore the frame check sequence check needs to be further performed on the information element. Because only the information element length is known, an information element with such a length needs to be extracted for check. Whether the information element is a correct information element is determined based on the check result.

When the information element length corresponding to the information element type field in the first delimiter is not corresponding to the information element length indicated by the length field in the first delimiter, it indicates that the information element length corresponding to the information element type field in the first delimiter is not equal to the information element length indicated by the length field in the first delimiter. In this case, whether the information elements are correct information elements still cannot be determined, and therefore the frame check sequence check needs to be further performed on the information elements. Because the information element length corresponding to the information element type field is not equal to the information element length indicated by the length field, the frame check sequence check needs to be performed separately on the information elements that are extracted separately based on the two fields, and whether the information elements are correct information elements is determined based on the check result.

The following uses the data packet format and the delimiter format shown in FIG. 6 as an example to describe in detail the steps of S130 of the method in another embodiment of this application.

When the receiving device receives the data packet sent by the sending device, where the data packet format is shown in FIG. 6, the receiving device first determines whether a CRC-1 in a delimiter 1 passes a check. When the CRC-1 in the delimiter 1 does not pass the check, it indicates that the delimiter 1 is an incorrect delimiter. In this case, whether an information element length corresponding to an information element type field 1 in the delimiter 1 is equal to an information element length indicated by a length field 1 in the delimiter 1 is detected. When the two lengths are equal, whether an information element with such a length is a correct information element still cannot be determined, and therefore the frame check sequence check needs to be further performed on the information element with the length. Therefore, the information element with the length needs to be extracted for check. Whether the information element is a correct information element is determined based on the check result. When the two lengths are not equal, the frame check sequence check needs to be performed separately on the information elements that are extracted based on the two lengths, and whether the information elements are correct information elements is determined based on the check result.

Optionally, in step 3, the parsing the information element based on a frame check sequence check result may include:

when the frame check sequence check is passed, determining, as a first information element, either of the information elements that pass the check;

determining a type of the first information element based on a length of the first information element, or determining a type of the first information element based on a length of the first information element and a sub-type field, in the first information element, used to indicate the type of the first information element; and parsing the first information element based on the type of the first information element and the length of the first information element.

Specifically, when the information element length corresponding to the information element type field in the first delimiter is corresponding to the information element length indicated by the length field in the first delimiter, there is only one information element length. Therefore, when the information element extracted based on the length passes the frame check sequence check, it indicates that the information element is a correct information element. The information element is determined as the first information element, that is, an information element corresponding to the first delimiter. When an information element with a specific length can be used to uniquely determine one information element type, the type of the first information element can be reversely deduced based on the length of the first information element. When an information element does not include a field indicating a type of the information element, or when an information element with a specific length is corresponding to at least two types of information elements, the type of the first information element needs to be determined based on the length of the first information element and the sub-type field, in the first information element, used to indicate the type of the first information element. In this case, after the length and the type of the first information element are determined, the content of the first information element can be parsed.

When the information element length corresponding to the information element type field in the first delimiter is not corresponding to the information element length indicated by the length field in the first delimiter, there are information elements with two lengths. Therefore, the frame check sequence check needs to be performed separately on the information elements that are extracted based on the two lengths.

When one of the information elements passes the frame check sequence check, it can be determined that the information element is a correct information element; or when the two information elements pass the frame check sequence check, it indicates that the two information elements may be correct information elements, and either of the information elements is determined as the first information element. In this way, the content of the first information element is to be parsed according to the method used when the information element length corresponding to the information element type field is corresponding to the information element length indicated by the length field in the first delimiter.

The following uses the data packet format and the delimiter format shown in FIG. 6 as an example to describe in detail step 3 in S130 of the method in this embodiment of this application, where step 3 is: Parse the information element based on a frame check sequence check result.

When the receiving device determines that the information element length corresponding to the information element type field 1 in the delimiter 1 is equal to the information element length indicated by the length field 1 in the delimiter 1, and the information element that is extracted based on the length passes the frame check sequence check, it may be determined that the information element is the information element 1. The receiving device determines a type of the information element 1 based on a length of the information element 1 or a sub-type field, at a fixed location in the information element 1, used to indicate the type of the information element 1, so as to parse content of the information element 1.

When the receiving device determines that the information element length corresponding to the information element type field 1 in the delimiter 1 is not equal to the information element length indicated by the length field 1 in the delimiter 1, and both/either of the two information elements that are extracted based on the two lengths pass/passes the frame check sequence check, either of the information elements that pass the check may be determined as the information element 1. The receiving device determines a type of the information element 1 based on a length of the information element 1 or a sub-type field, at a fixed location in the information element 1, used to indicate the type of the information element 1, so as to parse content of the information element 1.

Optionally, in step 3, the parsing the information element based on a frame check sequence check result may further include:

when the frame check sequence check is not passed, sequentially extracting content whose length is R bits in the data packet by using a sliding window, and determining a second delimiter, in the data packet, that is adjacent to the first delimiter and that passes the cyclic redundancy code field check, where a length of the first delimiter is R bits;

extracting a first information element between the first delimiter and the second delimiter;

determining a type of the first information element based on a length of the first information element, or determining a type of the first information element based on a length of the first information element and a sub-type field, in the first information element, used to indicate the type of the first information element; and parsing the first information element based on the type of the first information element and the length of the first information element.

Specifically, when the information element length corresponding to the information element type field in the first delimiter is equal to the information element length indicated by the length field in the first delimiter, and the information element that is extracted based on the length does not pass the frame check sequence check, or when the information element length corresponding to the information element type field in the first delimiter is not equal to the information element length indicated by the length field in the first delimiter, and neither of the information elements that are extracted based on the two lengths passes the frame check sequence check, the sliding window needs to be started to find a next delimiter. Optionally, the length of the content extracted by using the sliding window may be the length of the first delimiter, that is, R bits. It should be understood that content of another length may alternatively be extracted. In this case, the content of the first information element is parsed by using a method similar to the method for finding the second delimiter based on the data packet format and the delimiter format shown in FIG. 6 by using the sliding window and for parsing the information element. To avoid repetition, details are not described herein again.

According to the data packet transmission method in this embodiment of this application, a simpler delimiter format is used, and the length field used to indicate the information element length is added to the delimiter. Therefore, the receiving device may parse the content of the information element by comparing the information element length indicated by the length field with the information element length corresponding to the information element type field, or attempt to parse the content of the information element separately based on the information element type field or the length field. In this way, the content of the information element can be parsed more quickly; and if the delimiter does not pass the cyclic redundancy check, the sliding window is prevented from being immediately started to search for a next delimiter. This can increase robustness of the delimiter, reduce complexity of the receiving device, improve recoverability of the delimiter, and reduce an overhead of the delimiter.

The foregoing embodiments of this application describe a case in which in each pair of a delimiter and an information element, one type of information element is uniquely corresponding to one information element length. However, in a case in which one type of information element is not uniquely corresponding to one information element length, a length indication may also be introduced to a fixed location in an information element. For example, when an information element type field indicates that an information element type is a data frame, but the data frame is corresponding to more than one length, a length of the data frame needs to be further indicated at a fixed location (for example, a first byte of the data frame) in the information element. In this way, the length of the data frame can be determined, and content of the data frame can be parsed. Alternatively, when the receiving device receives an incorrect delimiter and learns an information element length, a length of an information element of a specific type may also be designed to be different from a length of an information element of another type, or the type of the information element may be further indicated in a fixed field of the information element with the length. In this way, the type of the information element with the length can be determined, and content of the information element is parsed.

Figure 7:
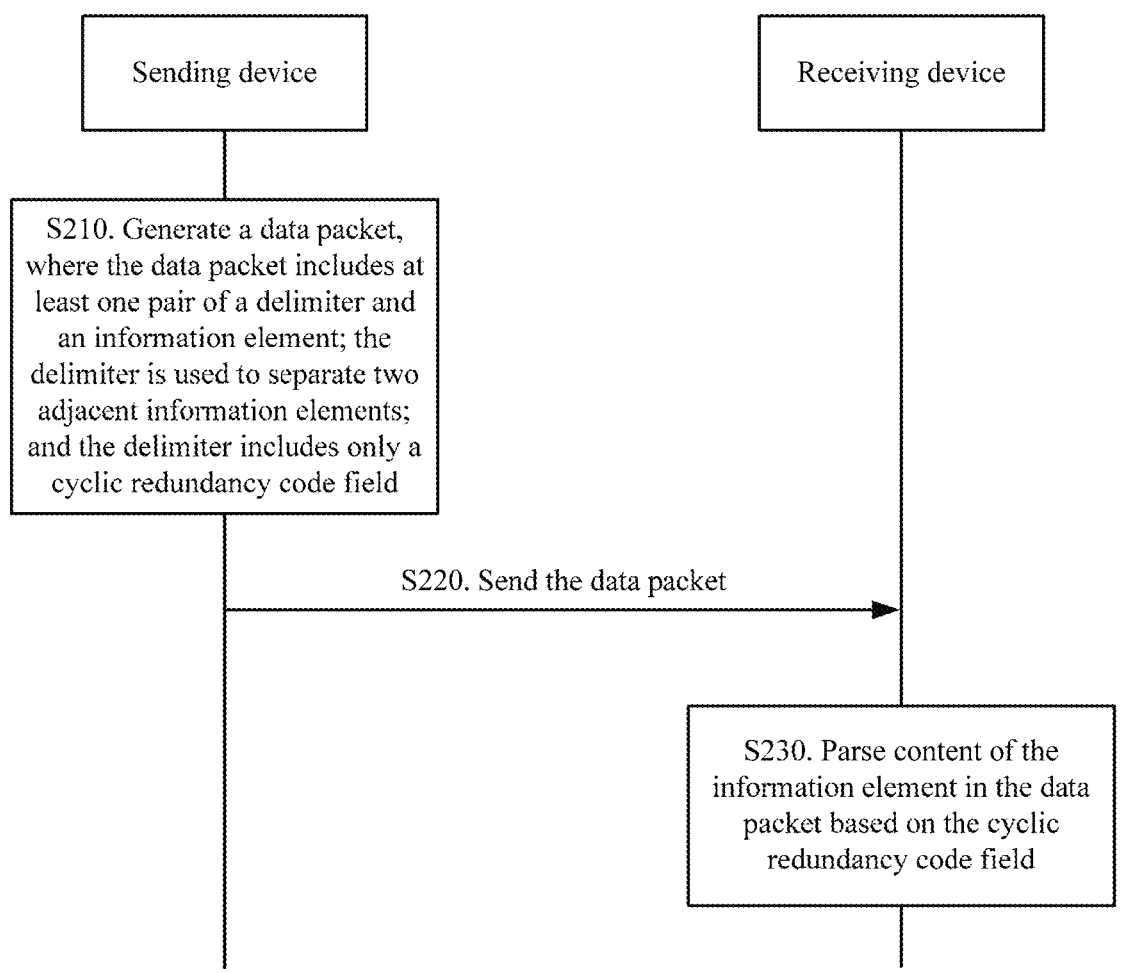
FIG. 7 is a schematic flowchart of a data packet transmission method according to another embodiment of this application.

An embodiment of this application further provides a data packet transmission method 200. FIG. 7 is a schematic flowchart of the data packet transmission method 200 according to this embodiment of this application. The method 200 includes the following steps.

S210. A sending device generates a data packet, where the data packet includes at least one pair of a delimiter and an information element, the delimiter is used to separate two adjacent information elements, and the delimiter includes only a cyclic redundancy code field.

S220. The sending device sends the data packet. Correspondingly, a receiving device receives the data packet. Specifically, the sending device sends the data packet to the receiving device, and the receiving device receives the data packet sent by the sending device.

S230. The receiving device parses content of the information element in the data packet based on the cyclic redundancy code field.

Therefore, according to the information transmission method in this embodiment of this application, a simpler delimiter format is used, where the delimiter includes only the cyclic redundancy code field, an overhead of the delimiter is reduced on the premise of implementing a function of the delimiter, an occupied resource is reduced, transmission efficiency is improved, and complexity of the receiving device is reduced.

It should be understood that in this embodiment of this application, an FCS is also a cyclic redundancy code. Because the CRC is used to detect a MAC frame, the CRC is also referred to as an FCS. Generally, an FCS is used to check an entire MAC frame, and a CRC is used to check a field such as a signaling field or a delimiter. Therefore, the frame check sequence and the cyclic redundancy code are interchangeable in this embodiment of this application. This is not limited in this embodiment of this application.

Figure 8:
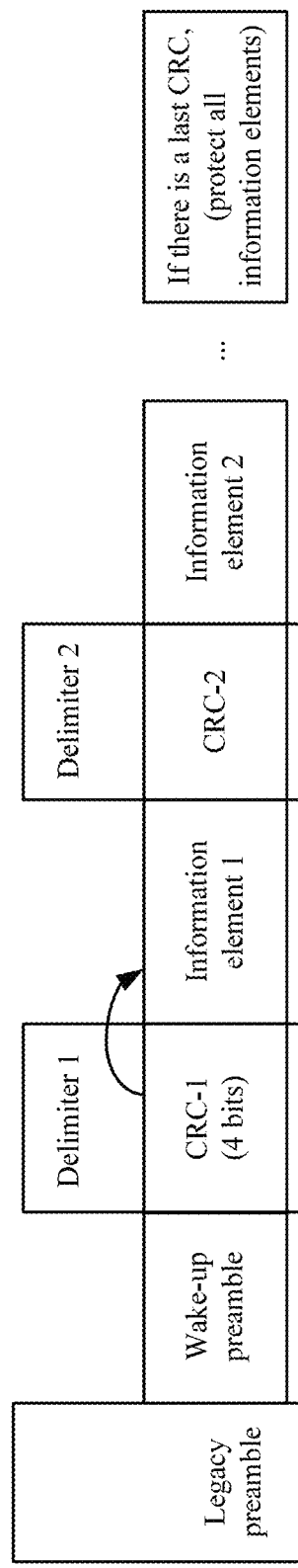
FIG. 8 is a schematic diagram of a data packet format and a delimiter format according to still another embodiment of this application.
Figure 9:
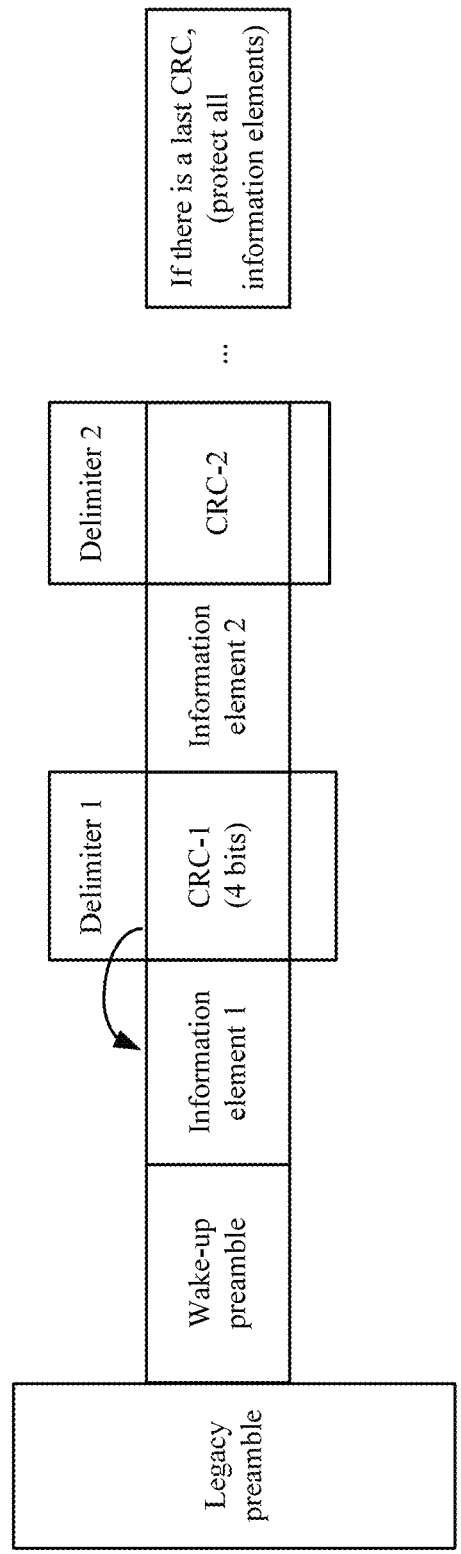
FIG. 9 is a schematic diagram of a data packet format and a delimiter format according to still another embodiment of this application.

Specifically, in an embodiment of this application, FIG. 8 or FIG. 9 is a schematic diagram of a data packet format and a delimiter format. A data packet includes an L-Preamble, a W-Preamble, and a plurality of pairs of delimiters and information elements. The L-Preamble is used to ensure coexistence (Coexistence) of data transmitted by using a common main link. The W-Preamble is usually used by the receiving device to perform wake up packet detection, signaling information reading, and the like. The delimiter in the data packet includes only a cyclic redundancy code field, and the cyclic redundancy code field is to protect content of an information element instead of the delimiter. For one pair of a delimiter and an information element, cyclic redundancy code field check is performed to determine whether the delimiter is correct. The information element may be a MAC frame such as a data frame, a beacon frame, or an acknowledgment frame, or may be a field at a physical layer. This is not limited in this embodiment of this application. A function of the delimiter is to separate a plurality of information elements. For one pair of a delimiter and an information element, the delimiter may be located before the information element, as shown in FIG. 8; or the delimiter may be located after the information element, as shown in FIG. 9.

Optionally, in an embodiment, in the data packet format and the delimiter format shown in FIG. 8 or FIG. 9, a length of the cyclic redundancy code field is 4 bits.

It should be understood that in the data packet format and the delimiter format shown in FIG. 8 or FIG. 9, a length of the cyclic redundancy code field may alternatively be another quantity of bits. This is not limited in this embodiment of this application.

It should also be understood that in the data packet format and the delimiter format shown in FIG. 8 or FIG. 9, the preamble in the data packet may alternatively be another preamble, or there may be a plurality of preambles. For example, the preamble may be an Internet of Things preamble used for transmission of an Internet of Things station. This is not limited in this embodiment of this application.

It should also be understood that the data packet format and the delimiter format shown in FIG. 8 or FIG. 9 are merely used as an example for description in this embodiment of this application, and this embodiment of this application is not limited thereto.

Optionally, in an embodiment, in S230, the parsing, by the receiving device, content of the information element in the data packet based on the cyclic redundancy code field may include the following steps.

Step 1: Determine two consecutive delimiters, in the delimiter, that pass cyclic redundancy code field check.

Step 2: Parse content of an information element between the two consecutive delimiters.

Specifically, after receiving the data packet sent by the sending device, the receiving device starts to parse the content of the information element in the data packet. Because information elements are delimited by delimiters one by one, an information element between two consecutive delimiters needs to be found, so as to parse content of the information element. Because a delimiter includes only a cyclic redundancy code field, two consecutive delimiters need to be found by using the cyclic redundancy code field, so as to determine an information element between the two delimiters. In this way, content of the information element between the two delimiters can be parsed.

Optionally, in an embodiment of step 1 of S230, the determining, by the receiving device, two consecutive delimiters, in the delimiter, that pass cyclic redundancy code field check may include the following steps.

Step 1: Determine a first delimiter, in the delimiter, that passes cyclic redundancy code field check.

Step 2: Sequentially extract fixed-length content in the data packet by using a sliding window.

Step 3: Determine a second delimiter, in the data packet, that is adjacent to the first delimiter and that passes the cyclic redundancy code field check.

Specifically, after receiving the data packet, the receiving device first performs the cyclic redundancy code field check on the delimiter; when the delimiter passes the cyclic redundancy code field check, determines that the delimiter is the first delimiter; otherwise, continues to perform the cyclic redundancy code field check on a delimiter, until the first delimiter that passes the cyclic redundancy code field check is found; and sequentially extracts the fixed-length content in the data packet by using the sliding window, until the second delimiter, in the data packet, that is adjacent to the first delimiter and that passes the cyclic redundancy code field check is found. In this way, after the first delimiter and the second delimiter are determined, content of an information element between the two delimiters can be parsed.

It should be understood that the first delimiter and the second delimiter represent two types of delimiters. Quantities of delimiters and information elements should not be limited. The first delimiter is a delimiter, in the data packet, that passes the cyclic redundancy code field check, and the second delimiter is a delimiter that is adjacent to the first delimiter and that passes the cyclic redundancy code field check. The first delimiter and the second delimiter may be a plurality of delimiters or may be one delimiter.

The following uses the data packet format and the delimiter format shown in FIG. 8 as an example to describe in detail S230 of the method in an embodiment of this application.

As shown in FIG. 8, when receiving the data packet sent by the sending device, the receiving device first determines whether a CRC-1 in a delimiter 1 passes a check. When the CRC-1 in the delimiter 1 passes the check, it indicates that the delimiter 1 is a correct delimiter; and starting from an information element 1, fixed-length content is sequentially extracted by using the sliding window, until a delimiter 2, in the data packet, that is adjacent to the delimiter 1 and that passes cyclic redundancy code field check is found. The CRC in delimiter 2 is assumed to be a CRC-2. In this way, the information element 1 between the CRC-1 and the CRC-2 can be extracted, and content of the information element 1 is parsed. When the CRC-1 in the delimiter 1 does not pass the check, a delimiter that passes the cyclic redundancy code field check continues to be found. The delimiter is determined as a first delimiter. A second delimiter is found by using the same method. Content of an information element between the two delimiters is parsed. Content of information elements in the entire data packet is parsed by using this method.

Optionally, it is assumed that a length of the CRC-1 field is X bits, a length of the information element 1 is Y bits, and X+Y constitutes all bytes. In a Wireless Fidelity (Wireless Fidelity, WiFi) system, a byte is used as a unit; therefore, if a field length is less than 1 byte, padding is usually performed to obtain a whole byte. In this case, as shown in FIG. 7, when the length of the CRC-1 is 4 bits, the length of the information element 1 may be an integral quantity of bytes plus 4 bits. Optionally, when the length of the CRC-1 is 8 bits, the length of the information element 1 is whole bytes. Optionally, the fixed length may be a sum of lengths of the CRC-1 and the information element 1.

It should be understood that the delimiter 1, the information element type field 1, and the information element 1 merely represent a delimiter and an information element that belong to a same pair. This should not impose any limitation on this embodiment of this application.

Therefore, according to the data packet transmission method in this embodiment of this application, a simpler delimiter format is used, where the delimiter includes only the cyclic redundancy code field, an overhead of the delimiter is reduced on the premise of implementing a function of the delimiter, an occupied resource is reduced, transmission efficiency is improved, and complexity of the receiving device is reduced.

It should be understood that sequence numbers of the foregoing processes and steps do not mean execution sequences in various embodiments of this application. The execution sequences of the processes should be determined based on functions and internal logic of the processes, and should not be construed as any limitation on the implementation processes of the embodiments of this application.

The following describes in detail the receiving device and the sending device in the embodiments of this application.

Figure 10:
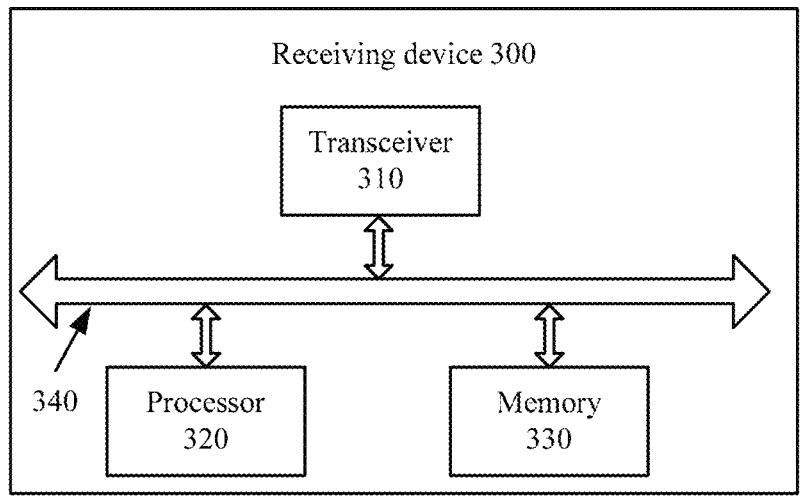
FIG. 10 is a schematic block diagram of a receiving device according to an embodiment of this application.

FIG. 10 is a schematic block diagram of a receiving device 300 according to an embodiment of this application. As shown in FIG. 10, the receiving device 300 includes:

a transceiver 310, configured to receive a data packet, where the data packet includes at least one pair of a delimiter and an information element; the delimiter is used to separate two adjacent information elements; the delimiter includes a cyclic redundancy code field and an information element type field; in each pair of a delimiter and an information element, the information element type field is used to indicate a type of the information element; and one type of information element is uniquely corresponding to one information element length; and a processor 320, configured to parse the information element based on the cyclic redundancy code field and the information element type field that are received by the transceiver 310.

According to the receiving device provided in this embodiment of this application, a simpler delimiter format is used in the data packet received by the receiving device, an overhead of the delimiter is reduced on the premise of implementing a function of the delimiter, an occupied resource is reduced, transmission efficiency is improved, and complexity of the receiving device is reduced.

Optionally, the receiving device 300 may further include a memory 330. The memory 330 may be configured to store code and the like that are executed by the processor 320.

Various components of the receiving device 300 are coupled together by using a bus system 340. In addition to a data bus, the bus system 340 includes a power bus, a control bus, and a status signal bus.

It should be noted that the foregoing method embodiments of this application may be applied to a processor or may be implemented by a processor. The processor may be an integrated circuit chip and has a signal processing capability. In an implementation process, steps in the foregoing method embodiments may be completed by using an integrated logic circuit of hardware in the processor or an instruction in a form of software. The processor may be a general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate, a transistor logic device, or a discrete hardware component. The processor can implement or perform the methods, steps and logical block diagrams disclosed in the embodiments of this application. The general-purpose processor may be a microprocessor, or the processor may alternatively be any conventional processor or the like. The steps of the methods disclosed with reference to the embodiments of this application may be directly implemented by a hardware decoding processor, or may be implemented by a combination of hardware in a decoding processor and a software module. The software module may be in a mature storage medium in the art such as a random-access memory, a flash memory, a read-only memory, a programmable read-only memory, an erasable programmable memory, or a register. The storage medium is located in the memory, and the processor reads information from the memory and completes the steps in the foregoing methods in combination with hardware of the processor.

Optionally, in an embodiment, the processor 320 is specifically configured to: determine a first delimiter, in the data packet, that passes cyclic redundancy code field check; determine a length of a first information element based on a type of the first information element that is corresponding to an information element type field in the first delimiter; and parse the first information element based on the type of the first information element and the length of the first information element.

Optionally, in an embodiment, the processor 320 is specifically configured to: determine a first delimiter, in the data packet, that does not pass cyclic redundancy code field check, where a length of the first delimiter is Z bits; sequentially extract content whose length is Z bits in the data packet by using a sliding window, and determine a second delimiter, in the data packet, that is adjacent to the first delimiter and that passes the cyclic redundancy code field check; extract a first information element between the first delimiter and the second delimiter; determine a type of the first information element based on a length of the first information element, or determine a type of the first information element based on a length of the first information element and a sub-type field, in the first information element, used to indicate the type of the first information element; and parse the first information element based on the type of the first information element and the length of the first information element.

Optionally, in an embodiment, in the data packet received by the transceiver 310, the delimiter further includes a length field. In each pair of a delimiter and an information element, the length field is used to indicate a length of the information element. The processor 320 is specifically configured to parse the information element based on the cyclic redundancy code field and at least one of the information element type field and the length field that are received by the transceiver 310.

Optionally, in an embodiment, the processor 320 is specifically configured to: determine a first delimiter, in the data packet, that passes cyclic redundancy code field check; extract a first information element based on either of an information element length corresponding to an information element type field in the first delimiter and an information element length indicated by the length field in the first delimiter; and parse the first information element based on a length of the first information element and a type that is of the first information element and is indicated by the information element type field in the first delimiter.

Optionally, in an embodiment, the processor 320 is specifically configured to: determine a first delimiter, in the delimiter, that does not pass cyclic redundancy code field check, where a length of the first delimiter is R bits; when an information element length corresponding to an information element type field in the first delimiter is corresponding to an information element length indicated by a length field in the first delimiter, extract the information element based on the information element length corresponding to the information element type field in the first delimiter or based on the information element length indicated by the length field in the first delimiter, and perform frame check sequence check on the extracted information element; or when an information element length corresponding to the information element type field in the first delimiter is not corresponding to an information element length indicated by the length field in the first delimiter, extract the information elements separately based on the information element length corresponding to the information element type field in the first delimiter and based on the information element length indicated by the length field in the first delimiter, and separately perform frame check sequence check on the extracted information elements; and parse the information element based on a frame check sequence check result.

Optionally, in an embodiment, the processor 320 is specifically configured to: determine an information element that passes the frame check sequence check; determine, as a first information element, either of the information elements that pass the check; and determine a type of the first information element based on a length of the first information element, or determine a type of the first information element based on a length of the first information element and a sub-type field, in the first information element, used to indicate the type of the first information element; and parse the first information element based on the type of the first information element and the length of the first information element.

Optionally, in an embodiment, the processor 320 is specifically configured to: determine that neither of the information elements passes the frame check sequence check; sequentially extract content whose length is R bits in the data packet by using a sliding window, and determine a second delimiter, in the data packet, that is adjacent to the first delimiter and that passes the cyclic redundancy code field check; extract a first information element between the first delimiter and the second delimiter; determine a type of the first information element based on a length of the first information element, or determine a type of the first information element based on a length of the first information element and a sub-type field, in the first information element, used to indicate the type of the first information element; and parse the first information element based on the type of the first information element and the length of the first information element.

Figure 11:
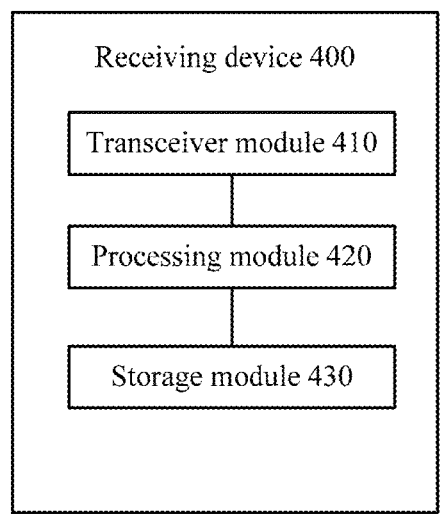
FIG. 11 is a schematic block diagram of a receiving device according to another embodiment of this application.

It should be noted that in this embodiment of this application, the processor 320 may be implemented by a processing module. The memory 330 may be implemented by a storage module. As shown in FIG. 11, a receiving device 400 may include a transceiver module 410, a processing module 420, and a storage module 430.

The receiving device 300 shown in FIG. 10 or the receiving device 400 shown in FIG. 11 can implement the processes implemented in the foregoing embodiments shown in FIG. 4. To avoid repetition, details are not described herein again.

Figure 12:
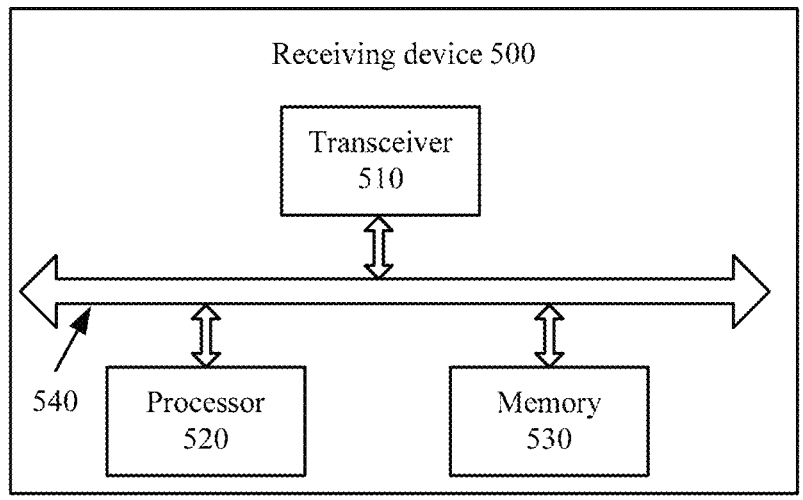
FIG. 12 is a schematic block diagram of a receiving device according to an embodiment of this application.

FIG. 12 is a schematic block diagram of a receiving device 500 according to an embodiment of this application. As shown in FIG. 12, the receiving device 500 includes:

a transceiver 510, configured to receive a data packet, where the data packet includes at least one pair of a delimiter and an information element; the delimiter is used to separate two adjacent information elements; and the delimiter includes only a cyclic redundancy code field; and a processor 520, configured to parse the information element based on the cyclic redundancy code field received by the transceiver 510.

According to the receiving device provided in this embodiment of this application, a simpler delimiter format is used in the data packet received by the receiving device, where the delimiter includes only the cyclic redundancy code field, an overhead of the delimiter is reduced on the premise of implementing a function of the delimiter, an occupied resource is reduced, transmission efficiency is improved, and complexity of the receiving device is reduced.

Optionally, the receiving device 500 may further include a memory 530. The memory 530 may be configured to store code and the like that are executed by the processor 520.

Various components of the receiving device 500 are coupled together by using a bus system 540. In addition to a data bus, the bus system 540 includes a power bus, a control bus, and a status signal bus.

Optionally, in an embodiment, the processor 520 is specifically configured to: determine two consecutive delimiters, in the delimiter, that pass cyclic redundancy code field check; and parse content of an information element between the two consecutive delimiters.

Optionally, in an embodiment, the processor 520 is specifically configured to: determine a first delimiter, in the delimiter, that passes the cyclic redundancy code field check; sequentially extract fixed-length content in the data packet by using a sliding window; and determine a second delimiter, in the data packet, that is adjacent to the first delimiter and that passes the cyclic redundancy code field check.

Figure 13:
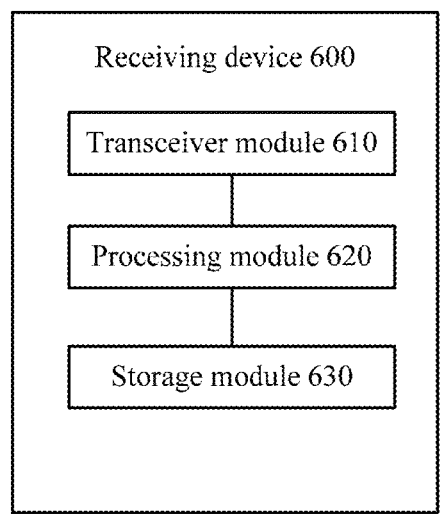
FIG. 13 is a schematic block diagram of a receiving device according to another embodiment of this application.

It should be noted that in this embodiment of this application, the processor 520 may be implemented by a processing module. The memory 530 may be implemented by a storage module. As shown in FIG. 13, the receiving device 600 may include a transceiver module 610, a processing module 620, and a storage module 630.

The receiving device 500 shown in FIG. 12 or the receiving device 600 shown in FIG. 13 can implement the processes implemented in the foregoing embodiments shown in FIG. 4. To avoid repetition, details are not described herein again.

Figure 14:
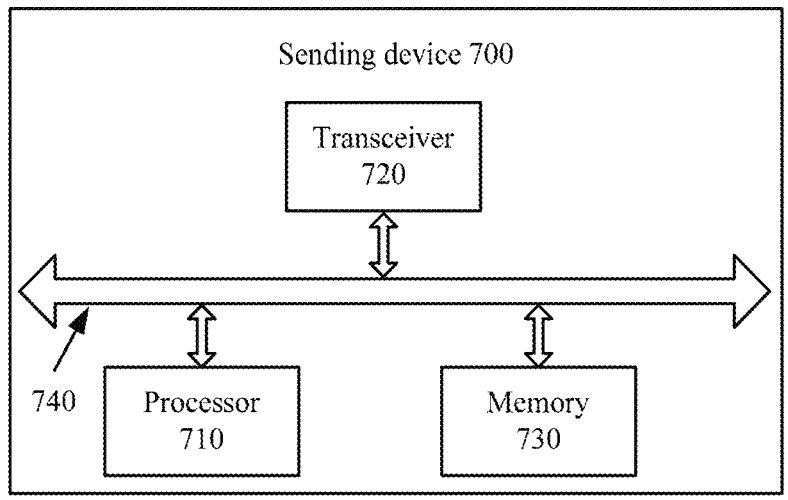
FIG. 14 is a schematic block diagram of a sending device according to an embodiment of this application.

FIG. 14 is a schematic block diagram of a sending device 700 according to an embodiment of this application. As shown in FIG. 14, the sending device 700 includes:

a processor 710, configured to generate a data packet, where the data packet includes at least one pair of a delimiter and an information element; the delimiter is used to separate two adjacent information elements; the delimiter includes a cyclic redundancy code field and an information element type field; in each pair of a delimiter and an information element, the information element type field is used to indicate a type of the information element; and one type of information element is uniquely corresponding to one information element length; and a transceiver 720, configured to send the data packet generated by the processor 710.

According to the sending device provided in this embodiment of this application, a simpler delimiter format is used in the data packet generated by the sending device, an overhead of the delimiter is reduced on the premise of implementing a function of the delimiter, an occupied resource is reduced, transmission efficiency is improved, and complexity of the receiving device is reduced.

Optionally, the sending device 700 may further include a memory 730. The memory 730 may be configured to store code and the like that are executed by the processor 710.

Various components of the sending device 700 are coupled together by using a bus system 740. In addition to a data bus, the bus system 740 includes a power bus, a control bus, and a status signal bus.

Optionally, in an embodiment, in the data packet generated by the processor 710, the delimiter further includes a length field; and in each pair of a delimiter and an information element, the length field is used to indicate a length of the information element.

Optionally, in an embodiment, in the data packet generated by the processor 710, when one information element length is corresponding to at least two types of information elements, the information element further includes a subtype field used to indicate the type of the information element.

Figure 15:
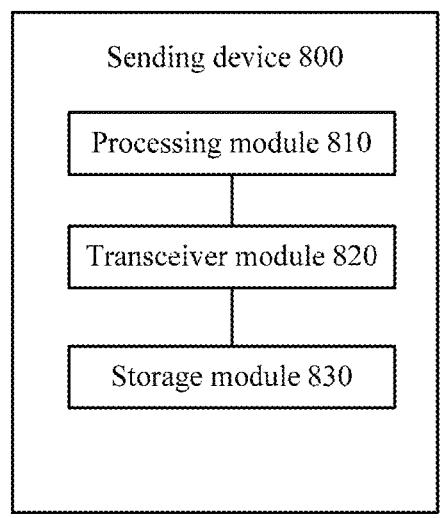
FIG. 15 is a schematic block diagram of a sending device according to another embodiment of this application.

It should be noted that in this embodiment of this application, the transceiver 720 may be implemented by a transceiver module. The processor 710 may be implemented by a processing module. The memory 730 may be implemented by a storage module. As shown in FIG. 15, a sending device 800 may include a processing module 810, a transceiver module 820, and a storage module 830.

The sending device 700 shown in FIG. 14 or the sending device 800 shown in FIG. 15 can implement the processes implemented in the foregoing embodiments shown in FIG. 4. To avoid repetition, details are not described herein again.

Figure 16:
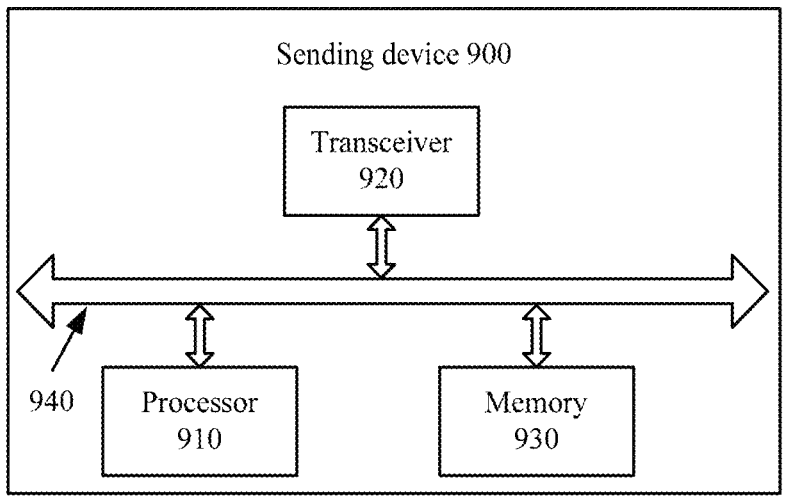
FIG. 16 is a schematic block diagram of a sending device according to an embodiment of this application.

FIG. 16 is a schematic block diagram of a sending device 900 according to an embodiment of this application. As shown in FIG. 16, the sending device 900 includes:

a processor 910, configured to generate a data packet, where the data packet includes at least one pair of a delimiter and an information element; the delimiter is used to separate two adjacent information elements; and the delimiter includes only a cyclic redundancy code field; and a transceiver 920, configured to send the data packet generated by the processor 910.

According to the sending device provided in this embodiment of this application, a simpler delimiter format is used in the data packet generated by the sending device, where the delimiter includes only the cyclic redundancy code field, an overhead of the delimiter is reduced on the premise of implementing a function of the delimiter, an occupied resource is reduced, transmission efficiency is improved, and complexity of the receiving device is reduced.

Optionally, the sending device 900 may further include a memory 930. The memory 930 may be configured to store code and the like that are executed by the processor 910.

Various components of the sending device 900 are coupled together by using a bus system 940. In addition to a data bus, the bus system 940 includes a power bus, a control bus, and a status signal bus.

Figure 17:
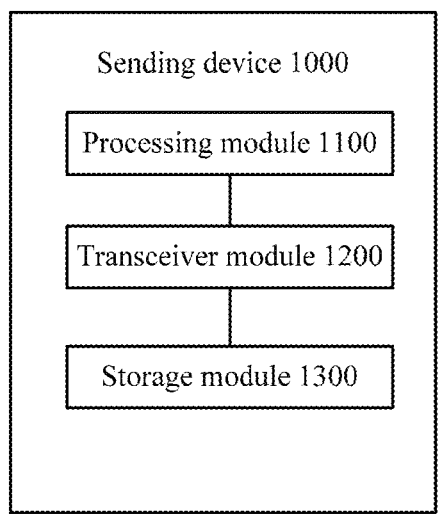
FIG. 17 is a schematic block diagram of a sending device according to another embodiment of this application.

It should be noted that in this embodiment of this application, the transceiver 920 may be implemented by a transceiver module. The processor 910 may be implemented by a processing module. The memory 930 may be implemented by a storage module. As shown in FIG. 17, a sending device 1000 may include a processing module 1100, a transceiver module 1200, and a storage module 1300.

The sending device 900 shown in FIG. 16 or the sending device 1000 shown in FIG. 17 can implement the processes implemented in the foregoing embodiments shown in FIG. 7. To avoid repetition, details are not described herein again.

An embodiment of this application provides a computer-readable medium, configured to store a computer program. The computer program includes instructions used to perform the data packet transmission methods in the embodiments of this application in FIG. 4 and FIG. 6. The readable medium may be a read-only memory (Read-Only Memory, ROM) or a random-access memory (Random Access Memory, RAM). This is not limited in this embodiment of this application.

An embodiment of this application further provides a computer-readable medium, configured to store a computer program. The computer program includes instructions used to perform the data packet transmission method in the embodiment of this application shown in FIG. 7. The readable medium may be a ROM or a RAM. This is not limited in this embodiment of this application.

An embodiment of this application further provides a communications system. The communications system includes the sending device and the receiving device that are provided in the foregoing embodiments of this application, and the communications system is capable of implementing any data packet transmission method provided in the embodiments of this application.

An embodiment of this application further provides a system chip. The system chip includes a processing unit and a communications unit, where the processing unit may be, for example, a processor, and the communications unit may be, for example, an input/output interface, a pin, or a circuit. The processing unit may execute a computer instruction, so that the chip inside the terminal performs any data packet transmission method.

Optionally, the computer instruction is stored in a storage unit.

Optionally, the storage unit may be a storage unit inside the chip, such as a register or a cache. Alternatively, the storage unit may be a storage unit, inside the terminal, located outside the chip, such as a ROM, another type of static storage device that can store static information and instructions, or a RAM. Any processor mentioned above may be a CPU, a microprocessor, an ASIC, or one or more integrated circuits executed by a program used to control the foregoing first direct-link data transmission method.

It should be understood that the terms "and/or" and "at least one of A or B" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected depending on actual needs to achieve the objectives of the solutions of the embodiments.

In addition, functional units in the embodiments of this application may be integrated into one processing unit, or each of the units may exist alone physically, or at least two units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data packet transmission method, comprising:
    receiving a data packet, wherein the data packet comprises at least one pair of a delimiter and an information element; the delimiter is used to separate two adjacent information elements;
    the delimiter comprises a cyclic redundancy code field and an information element type field; in each pair of a delimiter and an information element, the information element type field is used to indicate a type of the information element; and one type of information element is uniquely corresponding to one information element length; and
    parsing the information element based on the cyclic redundancy code field and the information element type field.

2. The method according to claim 1, wherein the parsing the information element based on the cyclic redundancy code field and the information element type field comprises:
    determining a first delimiter, in the data packet, that passes cyclic redundancy code field check;
    determining a length of a first information element based on a type of the first information element that is corresponding to an information element type field in the first delimiter; and
    parsing the first information element based on the type of the first information element and the length of the first information element.

3. The method according to claim 1, wherein the parsing the information element based on the cyclic redundancy code field and the information element type field comprises:
    determining a first delimiter, in the data packet, that does not pass cyclic redundancy code field check, wherein a length of the first delimiter is Z bits;
    sequentially extracting content whose length is Z bits in the data packet by using a sliding window, and determining a second delimiter, in the data packet, that is adjacent to the first delimiter and that passes the cyclic redundancy code field check;
    extracting a first information element between the first delimiter and the second delimiter;
    determining a type of the first information element based on a length of the first information element, or determining a type of the first information element based on a length of the first information element and a sub-type field, in the first information element, used to indicate the type of the first information element; and
    parsing the first information element based on the type of the first information element and the length of the first information element.

4. The method according to claim 1, wherein the delimiter further comprises a length field; in each pair of a delimiter and an information element, the length field is used to indicate a length of the information element; and the parsing the information element based on the cyclic redundancy code field and the information element type field comprises:
    parsing the information element based on the cyclic redundancy code field and at least one of the information element type field and the length field.

5. The method according to claim 4, wherein the parsing the information element based on the cyclic redundancy code field and at least one of the information element type field and the length field comprises:
    determining a first delimiter, in the data packet, that passes cyclic redundancy code field check;
    extracting a first information element based on either of an information element length corresponding to an information element type field in the first delimiter and an information element length indicated by a length field in the first delimiter; and
    parsing the first information element based on a length of the first information element and a type that is of the first information element and is indicated by the information element type field in the first delimiter.

6. The method according to claim 4, wherein the parsing the information element based on the cyclic redundancy code field and at least one of the information element type field and the length field comprises:
    determining a first delimiter, that does not pass cyclic redundancy code field check, wherein a length of the first delimiter is R bits;
    when an information element length corresponding to an information element type field in the first delimiter is corresponding to an information element length indicated by a length field in the first delimiter, extracting the information element based on the information element length corresponding to the information element type field in the first delimiter or based on the information element length indicated by the length field in the first delimiter, and performing frame check sequence check on the extracted information element; or
    when an information element length corresponding to an information element type field in the first delimiter is not corresponding to an information element length indicated by a length field in the first delimiter, extracting the information elements separately based on the information element length corresponding to the information element type field in the first delimiter and based on the information element length indicated by the length field in the first delimiter, and separately performing frame check sequence check on the extracted information elements; and parsing the information element based on a frame check sequence check result.

7. The method according to claim 6, wherein the parsing the information element based on a frame check sequence check result comprises:

determining, a first information element, that passes frame check sequence check; and determining a type of the first information element based on a length of the first information element, or determining a type of the first information element based on a length of the first information element and a sub-type field, in the first information element, used to indicate the type of the first information element; and parsing the first information element based on the type of the first information element and the length of the first information element.

8. The method according to claim 6, wherein the parsing the information element based on a frame check sequence check result comprises:

determining an information elements that does not pass the frame check sequence check;

sequentially extracting content whose length is R bits in the data packet by using a sliding window, and determining a second delimiter, in the data packet, that is adjacent to the first delimiter and that passes the cyclic redundancy code field check;

extracting a first information element between the first delimiter and the second delimiter;

determining a type of the first information element based on a length of the first information element, or determining a type of the first information element based on a length of the first information element and a sub-type field, in the first information element, used to indicate the type of the first information element; and parsing the first information element based on the type of the first information element and the length of the first information element.

9. A receiving device, comprising:

a transceiver, configured to receive a data packet, wherein the data packet comprises at least one pair of a delimiter and an information element; the delimiter is used to separate two adjacent information elements; the delimiter comprises a cyclic redundancy code field and an information element type field; in each pair of a delimiter and an information element, the information element type field is used to indicate a type of the information element; and one type of information element is uniquely corresponding to one information element length; and a processor, configured to parse the information element based on the cyclic redundancy code field and the information element type field that are received by the transceiver.

10. The receiving device according to claim 9, wherein the processor is configured to:

determine a first delimiter, in the data packet, that passes cyclic redundancy code field check;

determine a length of a first information element based on a type of the first information element that is corresponding to an information element type field in the first delimiter; and parse the first information element based on the type of the first information element and the length of the first information element.

11. The receiving device according to claim 9, wherein the processor is configured to:

determine a first delimiter, in the data packet, that does not pass cyclic redundancy code field check, wherein a length of the first delimiter is Z bits;

sequentially extract content whose length is Z bits in the data packet by using a sliding window, and determine a second delimiter, in the data packet, that is adjacent to the first delimiter and that passes the cyclic redundancy code field check;

extract a first information element between the first delimiter and the second delimiter;

determine a type of the first information element based on a length of the first information element, or determine a type of the first information element based on a length of the first information element and a sub-type field, in the first information element, used to indicate the type of the first information element; and parse the first information element based on the type of the first information element and the length of the first information element.

12. The receiving device according to claim 9, wherein in the data packet received by the transceiver, the delimiter further comprises a length field; in each pair of a delimiter and an information element, the length field is used to indicate a length of the information element; and the processor is configured to:

parse the information element based on the cyclic redundancy code field and at least one of the information element type field and the length field that are received by the transceiver.

13. The receiving device according to claim 12, wherein the processor is configured to:

determine a first delimiter, in the data packet, that passes cyclic redundancy code field check;

extract a first information element based on either of an information element length corresponding to an information element type field in the first delimiter and an information element length indicated by a length field in the first delimiter; and parse the first information element based on a length of the first information element and a type that is of the first information element and is indicated by the information element type field in the first delimiter.

14. The receiving device according to claim 12, wherein the processor is configured to:

determine a first delimiter, that does not pass cyclic redundancy code field check, wherein a length of the first delimiter is R bits;

when an information element length corresponding to an information element type field in the first delimiter is corresponding to an information element length indicated by the length field in the first delimiter, extract the information element based on the information element length corresponding to the information element type field in the first delimiter or based on the information element length indicated by the length field in the first delimiter, and perform frame check sequence check on the extracted information element; or when an information element length corresponding to an information element type field in the first delimiter is not corresponding to an information element length indicated by a length field in the first delimiter, extract the information elements separately based on the information element length corresponding to the information element type field in the first delimiter and based on the information element length indicated by the length field in the first delimiter, and separately perform frame check sequence check on the extracted information elements; and parse the information element based on a frame check sequence check result.

15. The receiving device according to claim 14, wherein the processor is configured to:
  determine, a first information element, that passes the frame check sequence check; and determine a type of the first information element based on a length of the first information element, or determine a type of the first information element based on a length of the first information element and a sub-type field, in the first information element, used to indicate the type of the first information element; and
  parse the first information element based on the type of the first information element and the length of the first information element.

16. The receiving device according to claim 14, wherein the processor is configured to:
  determine an information elements that does not pass the frame check sequence check;
  sequentially extract content whose length is R bits in the data packet by using a sliding window, and determine a second delimiter, in the data packet, that is adjacent to the first delimiter and that passes the cyclic redundancy code field check;
  extract a first information element between the first delimiter and the second delimiter;
  determine a type of the first information element based on a length of the first information element, or determine a type of the first information element based on a length of the first information element and a sub-type field, in the first information element, used to indicate the type of the first information element; and
  parse the first information element based on the type of the first information element and the length of the first information element.

17. A sending device, comprising:
  a processor, configured to generate a data packet, wherein the data packet comprises at least one pair of a delimiter and an information element; the delimiter is used to separate two adjacent information elements; the delimiter comprises a cyclic redundancy code field and an information element type field; in each pair of a delimiter and an information element, the information element type field is used to indicate a type of the information element; and one type of information element is uniquely corresponding to one information element length; and
  a transceiver, configured to send the data packet generated by the processor.

18. The sending device according to claim 17, wherein in the data packet generated by the processor, the delimiter further comprises a length field; and in each pair of a delimiter and an information element, the length field is used to indicate a length of the information element.

19. The sending device according to claim 17, wherein in the data packet generated by the processor, when one information element length is corresponding to at least two types of information elements, the information element further comprises a sub-type field used to indicate the type of the information element.

\* \* \* \* \*